US009753137B2

(12) United States Patent
Roberts

(10) Patent No.: US 9,753,137 B2
(45) Date of Patent: Sep. 5, 2017

(54) APPARATUS, SYSTEM AND METHOD OF COMMUNICATING POSITIONING INFORMATION

(71) Applicant: INTEL CORPORATION, Santa Clara, CA (US)

(72) Inventor: Richard D. Roberts, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 763 days.

(21) Appl. No.: 14/129,299

(22) PCT Filed: May 26, 2013

(86) PCT No.: PCT/US2013/042782
§ 371 (c)(1),
(2) Date: Dec. 26, 2013

(87) PCT Pub. No.: WO2014/193334
PCT Pub. Date: Dec. 4, 2014

(65) Prior Publication Data
US 2014/0347648 A1    Nov. 27, 2014

(51) Int. Cl.
*G01S 17/06*    (2006.01)
*H04B 10/116*    (2013.01)
*G01S 17/93*    (2006.01)

(52) U.S. Cl.
CPC ............ *G01S 17/06* (2013.01); *G01S 17/936* (2013.01); *H04B 10/116* (2013.01)

(58) Field of Classification Search
CPC ..... G02B 6/4206; G02B 6/2861; H04B 10/12
See application file for complete search history.

(56) References Cited

U.S. PATENT DOCUMENTS

| 5,081,344 A | 1/1992 | Misawa |
| 5,119,104 A | 6/1992 | Heller |
| 5,305,134 A | 4/1994 | Tsushima et al. |
| 5,508,917 A | 4/1996 | Siegle et al. |

(Continued)

FOREIGN PATENT DOCUMENTS

| JP | 05-034436 | 2/1993 |
| WO | 2011/128739 | 10/2011 |

(Continued)

OTHER PUBLICATIONS

Office Action for U.S. Appl. No. 13/976,989, mailed on Mar. 11, 2016, 23 pages.

(Continued)

*Primary Examiner* — Luke Ratcliffe
(74) *Attorney, Agent, or Firm* — Shichrur & Co.

(57) ABSTRACT

Some demonstrative embodiments include apparatuses, systems and/or methods of communicating positioning information. For example, an apparatus may include an optical communication unit to communicate Intensity-Modulated (IM) optical signals of a positioning packet, the positioning packet including a first portion and a second portion, the first portion including information modulated over a first frequency band, and the second portion including On-Off-Keying (OOK) signals over a second frequency band, the second frequency band is different from the first frequency band.

30 Claims, 13 Drawing Sheets

(56) References Cited

U.S. PATENT DOCUMENTS

| | | |
|---|---|---|
| 5,914,687 A | 6/1999 | Rose |
| 5,915,233 A | 6/1999 | Nonaka |
| 6,031,600 A | 2/2000 | Winner et al. |
| 6,128,576 A | 10/2000 | Nishimoto et al. |
| 6,801,782 B2 | 10/2004 | McCrady et al. |
| 6,831,591 B2 | 12/2004 | Horibe |
| 7,132,981 B1 | 11/2006 | Roberts |
| 7,292,631 B2 | 11/2007 | Gregorius |
| 7,610,146 B2 | 10/2009 | Breed |
| 7,710,246 B2 | 5/2010 | Arakawa et al. |
| 7,844,144 B2 | 11/2010 | Kahn et al. |
| 7,864,032 B2 | 1/2011 | Kogure et al. |
| 8,050,863 B2 | 11/2011 | Trepagnier et al. |
| 8,145,393 B2 | 3/2012 | Foster et al. |
| 8,258,837 B2 | 9/2012 | Mosalikanti et al. |
| 8,346,480 B2 | 1/2013 | Trepagnier et al. |
| 8,411,258 B2 | 4/2013 | Roberts et al. |
| 8,718,918 B2 | 5/2014 | Roberts |
| 8,949,069 B2 | 2/2015 | Roberts et al. |
| 2001/0053699 A1 | 12/2001 | McCrady et al. |
| 2002/0030611 A1 | 3/2002 | Nuesser et al. |
| 2003/0098992 A1 | 5/2003 | Park et al. |
| 2004/0234268 A1* | 11/2004 | Olch .................. H04B 10/1149 398/118 |
| 2004/0247025 A1 | 12/2004 | Gregorius |
| 2006/0056855 A1 | 3/2006 | Nakagawa et al. |
| 2006/0094350 A1 | 5/2006 | Ishimura et al. |
| 2006/0132353 A1 | 6/2006 | Natsume et al. |
| 2006/0285102 A1 | 12/2006 | Aoki et al. |
| 2007/0102619 A1 | 5/2007 | Kusaka |
| 2007/0296951 A1 | 12/2007 | Kuijk et al. |
| 2008/0108372 A1 | 5/2008 | Breed |
| 2008/0143584 A1 | 6/2008 | Shoarinejad et al. |
| 2008/0243351 A1 | 10/2008 | Isogai et al. |
| 2009/0072996 A1 | 3/2009 | Schoepp |
| 2009/0134918 A1 | 5/2009 | Tzeng |
| 2009/0169220 A1* | 7/2009 | Kahn ................... G02B 6/4206 398/200 |
| 2009/0237293 A1 | 9/2009 | Sakuma |
| 2009/0243679 A1 | 10/2009 | Smith et al. |
| 2009/0251976 A1 | 10/2009 | Amarilio et al. |
| 2010/0067633 A1 | 3/2010 | Den Besten |
| 2010/0156459 A1 | 6/2010 | Plants et al. |
| 2010/0207820 A1 | 8/2010 | Kawano et al. |
| 2010/0225370 A1 | 9/2010 | Demone |
| 2010/0271617 A1 | 10/2010 | Damink et al. |
| 2011/0018601 A1 | 1/2011 | Yoshizawa et al. |
| 2011/0074477 A1 | 3/2011 | Nagarajan et al. |
| 2011/0144941 A1 | 6/2011 | Roberts et al. |
| 2011/0148486 A1 | 6/2011 | Mosalikanti et al. |
| 2011/0169684 A1 | 7/2011 | Margolin |
| 2011/0212699 A1 | 9/2011 | Howard et al. |
| 2011/0261347 A1 | 10/2011 | Kassamakov et al. |
| 2011/0274432 A1 | 11/2011 | Cunningham |
| 2012/0162633 A1 | 6/2012 | Roberts et al. |
| 2013/0126713 A1* | 5/2013 | Haas .................... H04B 10/116 250/208.2 |
| 2013/0271747 A1 | 10/2013 | Roberts |
| 2013/0293423 A1 | 11/2013 | Moshfeghi |
| 2013/0315604 A1 | 11/2013 | LoPresti et al. |
| 2014/0093234 A1 | 4/2014 | Roberts et al. |
| 2014/0180634 A1 | 6/2014 | Mahajan |
| 2015/0016824 A1 | 1/2015 | Roberts |

FOREIGN PATENT DOCUMENTS

| | | |
|---|---|---|
| WO | 2012/087944 | 6/2012 |
| WO | 2013/048502 | 4/2013 |
| WO | 2013/081595 | 6/2013 |
| WO | 2013/162559 | 10/2013 |

OTHER PUBLICATIONS

Office Action for U.S. Appl. No. 14/129,303, mailed on Jul. 6, 2015, 21 pages.
International Preliminary Report on Patentability for PCT/US2013/049825, mailed on Jan. 21, 2016, 9 pages.
International Search Report and Written Opinion for PCT Patent Application No. PCT/US2011/065866, mailed on Sep. 14, 2012, 15 pages.
Bucher et al., "A Synthesizable VHDL Model of the Exact Solution for Three-dimensional Hyperbolic Positioning System", VLSI Design, 2002, vol. 15, Issue No. 2, 14 pages.
Klym et al., "The Evoltion of RFID Networks: The Potential for Disruptive Innovation", Cambridge University Communications Research Network, Mar. 2006, 20 pages.
International Preliminary Report on Patentability and Written Opinion for PCT Patent Application No. PCT/US2011/062578, mailed on Jun. 12, 2014, 7 pages.
International Search Report and Written Opinion for PCT Patent Application No. PCT/US2011/062578, mailed on Jul. 11, 2012, 10 pages.
International Preliminary Report on Patentability and Written Opinion for PCT Patent Application No. PCT/US2011/065866, mailed on Jul. 4, 2013, 6 pages.
International Search Report and Written Opinion for PCT Patent Application No. PCT/US2012/035117, mailed on Dec. 21, 2012, 9 pages.
International Search Report and Written Opinion for PCT Patent Application No. PCT/US2013/042782, mailed on Mar. 20, 2014, 12 pages.
International Search Report and Written Opinion for PCT Patent Application No. PCT/US2013/049825, mailed on Apr. 17, 2014, 13 pages.
Wen et al., "Distance Estimation Using Bidirectional Communications Without Synchronous Clocking", Feb. 4, 2006, 30 pages.
Roberts, Richard D., "Apparatus, System and Method of Communicating Positioning Transmissions", U.S. Appl. No. 14/129,303, filed Dec. 26, 2013, 57 pages.
Office Action for U.S. Appl. No. 12/639,236, mailed on Apr. 30, 2012, 11 pages.
Notice of Allowance for U.S. Appl. No. 12/639,236, mailed on Aug. 21, 2012, 10 pages.
Ex parte Quayle Office Action for U.S. Appl. No. 12/639,236, mailed on Jul. 11, 2014, 7 pages.
Office Action for U.S. Appl. No. 12/640,842, mailed on Dec. 16, 2011, 7 pages.
Notice of Allowance for the U.S. Appl. No. 12/640,842, mailed on Apr. 30, 2012, 6 pages.
Office Action for U.S. Appl. No. 12/975,451, mailed on Feb. 9, 2012, 16 pages.
Office Action for U.S. Appl. No. 12/975,451, mailed on Jul. 5, 2012, 16 pages.
Notice of Allowance for U.S. Appl. No. 12/975,451, mailed on Dec. 12, 2012, 5 pages.
Notice of Allowance for U.S. Appl. No. 13/977,671, mailed on Dec. 27, 2013, 13 pages.
Roberts et al., "Visible Light Positioning: Automotive Use Case", 2010 IEEE Vehicular Networking Conference, 2010 IEEE, 6 pages.
Notice of Allowance for U.S. Appl. No. 12/639,236, mailed Sep. 30, 2014, 15 pages.
International Preliminary Report on Patentability for International Patent Application No. PCT/US2013/042782, mailed on Dec. 10, 2015, 8 pages.
Office Action for U.S. Appl. No. 13/976,989, mailed on Jul. 15, 2016, 21 pages.
Office Action for U.S. Appl. No. 13/976,989, dated Mar. 16, 2017, 14 pages.

* cited by examiner

APPARATUS, SYSTEM AND METHOD OF COMMUNICATING POSITIONING INFORMATION

CROSS REFERENCE

This application is a National Phase Application of PCT International Application No. PCT/US2013/42782, International Filing Date May 26, 2013, the entire disclosure of which is incorporated herein by reference.

TECHNICAL FIELD

Embodiments described herein generally relate to communicating positioning information, and more particularly, to communicating vehicle-positioning information.

BACKGROUND

Various object-detection systems and techniques exist. For example, Sound Navigation and Ranging (SONAR) is a technique that uses the propagation of sound waves to navigate or to communicate with or detect objects. SONAR may be used for acoustic location in both water and in the air, but has generally been supplanted by Radio Detection and Ranging (RADAR) for determining the range, speed, and so forth, of objects in the air. SONAR encompasses two primary types of ranging and detection schemes including passive SONAR, which involves listening for the sound made by vessels, and active SONAR, which involves emitting pulses of sounds and listening for echoes that are generated. While SONAR is a relatively inexpensive technology and is fairly accurate at short ranges, SONAR offers a relatively poor resolution compared to RADAR and other ranging technologies.

RADAR is an object detection system that makes use of radio waves to determine the range, altitude, speed, and so forth of objects. RADAR technology generally includes a transmitter that transmits pulses of radio waves or microwaves that bounce off of objects in their path. The objects return a portion of the wave's energy to a dish or antenna typically located in proximity to the transmitter. RADAR is not capable of directly determining position information between objects, e.g., an angular relationship between objects, which instead must be inferred from the range determination and an angle of the antenna. RADAR is a relatively expensive technology that provides better accuracy at longer ranges and better resolution than SONAR.

Light Detection and Ranging (LIDAR) is an optical remote sensing technology capable of measuring the distance to, or other properties of, a target, by illuminating the target with a pulse of light in the ultraviolet, visible, or near infrared spectrum from a Light Amplification by Stimulated Emission of Radiation (laser) source. LIDAR systems include both coherent and incoherent detection systems, each of which further encompasses two types of pulse models, namely, micropulse and high-energy systems. Micropulse systems use considerably less energy in the laser and are typically "eye-safe." High-energy systems are more commonly employed in conducting atmospheric research. LIDAR sensors mounted on mobile platforms require instrumentation to determine the absolute position and orientation of the sensor. Such instrumentation generally includes a Global Positioning System (GPS) receiver and an Inertial Measurement Unit (IMU). Similar to RADAR, LIDAR is only capable of determining a distance between objects; any determination of position information between objects must be inferred indirectly. While LIDAR generally offers better accuracy and higher resolution than other ranging technologies, such as SONAR and RADAR, LIDAR is also considerably more expensive to implement.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
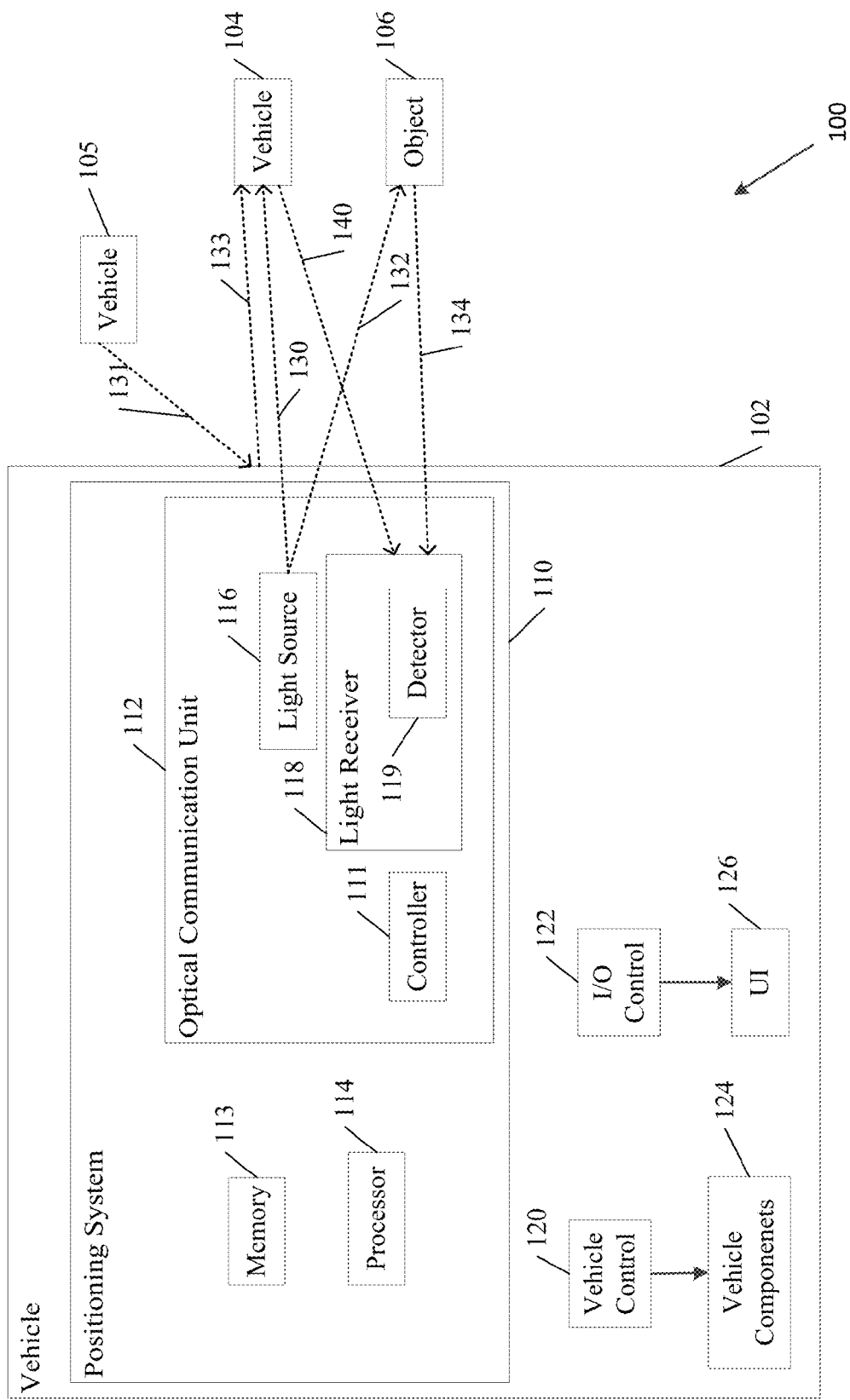
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

The term "communicating", as used herein with respect to a communication signal, includes transmitting the communication signal and/or receiving the communication signal. For example, a transceiver, which is capable of communicating a communication signal, may include a transmitter to transmit the communication signal to at least one communication device, and/or a receiver to receive the communication signal from at least one communication device. The signal may be communicated as part of a unidirectional communication or as part of a bidirectional communication.

The term "vehicle", as used herein, may refer to, but is not limited to, any that mobile device configured to transports passengers or cargo. The vehicle may include a land vehicle or a non-land vehicle or craft. In some non-limiting examples, vehicles may include, cars, motor-vehicles, road vehicles, motorcycles, mopeds, scooters, bicycles, two-wheeled vehicles, four-wheeled vehicles, all-terrain vehicles (ATVs), trucks, light-duty trucks, heavy-duty trucks, pickup trucks, minivans, crossover utility vehicles (CUVs), vans, commercial vehicles, private vehicles, sport utility vehicles (SUVs), tractor-trailers, airplanes, helicopters, other aircraft, spacecraft, satellites, or any other suitable mobile object provided with communicative and sensory capabilities.

Although some embodiments are described herein with respect to a vehicle, it should be appreciated that other embodiments may also be utilized in other transportation or non-transportation related applications where electronic communications between two systems may be implemented. For example, some embodiments may be implemented with respect to any non-vehicular device, e.g., a mobile device.

The term "position", as used herein with reference to an entity, e.g., a vehicle or an object, may include a placement, a location, a rotation, and/or an orientation of the entity. For example, the position may be represented by a "position vector", which may include a vector in a two or three-dimensional space, e.g., <x, y, z>, or any other space, representation or coordinate system. The term "distance", as used herein, may refer, for example, to a relative position, e.g., between an entity and a reference position or another entity. For example, the distance may be determined by the hypotenuse or magnitude of a position vector.

Reference is now made to FIG. 1, which schematically illustrates a block diagram of a system 100, in accordance with some demonstrative embodiments.

In some demonstrative embodiments, system 100 may include one or more vehicles, e.g., including vehicles 102 and/or 104.

In some demonstrative embodiments, at least one vehicle of system 100, e.g., vehicles 102 and/or 104, may include a positioning system 110, which may be utilized for determining the position of the vehicle, e.g., vehicle 102, for example, with respect to at least one other vehicle, e.g., vehicle 104, and/or at least one object, e.g., object 106, as described in detail below.

In some demonstrative embodiments, the positioning system of vehicles 102 and/or 104 may be configured to modulate a light source, e.g., with high frequency intensity modulation, to detect the transmitted light with spatial separation, to measure differential subcarrier phase shifts, and based on the detected phase to determine position information relating to the positioning of vehicles 102 and/or 104 and/or object 106, e.g., as described below.

In some demonstrative embodiments, positioning system 110 may include at least one optical communication 112 unit configured to communicate Intensity-Modulated (IM) optical signals, e.g., as described below.

In some demonstrative embodiments, optical communication unit 112 may include one or more light sources 116 (also referred to as "light transmitters" or "optical transmitters") to transmit the IM optical signals, e.g., as described below.

In some demonstrative embodiments, lights sources 116 may be configured to emit radiation at any suitable wavelength, intensity, and/or coherence. For example, light sources 116 may be configured to emit monochromatic or polychromatic radiation in the ultraviolet (UV), near-ultraviolet (near-UV), infrared (IR), or visible range.

In some demonstrative embodiments, light source 116 may include a light-emitting diode (LED) configured to emit radiation in the UV, near-UV, IR, or visible wavelength range. In other embodiments, light sources 116 may include any other light source. For example, light sources 116 may include incandescent lamps, halogen lamps, fluorescent lamps, compact fluorescent lamps, gas discharge lamps, light amplification by stimulated emission of radiation (lasers), diode lasers, gas lasers, solid state lasers, and/or any other light source or any combinations thereof.

In some demonstrative embodiments, one or more light sources 116 may be implemented as part of one or more signaling lights of the vehicle 102. One or more light sources 116 may include LEDs, which may be implemented as part of one or more vehicle signaling lights of vehicle 102. For example, the one or more signaling lights may include, tail lights, brake lights, reverse lights, headlights, side lights, mirror lights, fog lamps, low beams, high beams, add-on lights, and/or any other signaling light or combinations thereof.

In some demonstrative embodiments, one or more light sources 116 may be positioned on the vehicle 102 independent of and/or separate from any signaling lights and may be configured to emit non-visible radiation such that a vehicle operator does not confuse the emitted radiation with other indications provided by the signaling lights.

In some demonstrative embodiments, optical communication unit 112 may include at least one light receiver 118 to receive the IM optical signals, e.g., as described below.

In some demonstrative embodiments, light receiver 118 may include at least one detector 119 to detect the IM optical signals. Detector 119 may include, for example, a photo-sensing device, a photodetecting device, photodiodes, optical detectors, LEDs that are reversed-biased to act as photodiodes, phototransistors, photoresistors, phototubes, photovoltaic cells, quantum dot photoconductors, charge-coupled devices (CCD), or active pixel sensors and/or any other signal sensors or detectors.

In some demonstrative embodiments, detector 119 may include a lensed detector array, which may include a lens and a linear detector array. For example, detector 119 may be operative to map an azimuth angle of arrival for detected light to pixel locations on an image plane of the linear detector array, e.g., as described below. According to this example, light detected at different pixels of the detector array may represent light received from different locations. Accordingly, detector 119 may be capable of spatially separating light received from spatially-separated light sources. In other embodiments, detector 119 may include any other elements and/or configuration.

In some demonstrative embodiments, optical communication unit 112 may include at least one light source 116 and at least light receiver 118. In other embodiments, optical communication unit 112 may include only light source 116 or light receiver 118.

In some demonstrative embodiments, optical communication unit 112 may be configured to perform a first positioning communication ("one way positioning"), in which optical communication unit 112 may communicate the IM optical signals in one direction, e.g., as described below with reference to FIGS. 2A, 2B, 3A and/or 3B.

In one example, optical communication unit 112 may perform one-way positioning (ranging) communication by transmitting IM optical signals to another vehicle. For example, optical communication unit 112 may perform one-way ranging communication by transmitting IM optical signals 130 from light source 116 to vehicle 104. Signals 130 may be used by vehicle 104, for example, to determine a positioning of vehicle 104, e.g., relative to vehicle 102.

In another example, optical communication unit 112 may perform one-way positioning communication by receiving IM optical signals from another vehicle. For example, optical communication unit 112 may perform one-way positioning communication by receiving at light receiver 118 IM optical signals 140 from vehicle 104. Signals 140 may be used by vehicle 102, for example, to determine a positioning of vehicle 102, e.g., relative to vehicle 104.

In some demonstrative embodiments, optical communication unit 112 may be configured to perform a second positioning (ranging) communication ("two way positioning"), in which optical communication unit 112 may communicate the IM optical signals in two directions. For example, optical communication unit 112 may transmit and receive IM optical signals, e.g., as described below with reference to FIGS. 4A and 4B.

In one example, optical communication unit 112 may perform two-way ranging communication by transmitting IM optical signals towards another element of system 100, e.g., object 106 or another vehicle. For example, optical communication unit 112 may perform two-way positioning communication by transmitting IM optical signals 132 from light source 116 towards object 106, and receiving at light receiver 118 signals 134 reflected by object 106. Signals 134 may be used by vehicle 102, for example, to determine a positioning of vehicle 102, e.g., relative to object 106.

In some demonstrative embodiments, the IM optical signals may include On-Off-Keying (OOK) signals, e.g., as described below.

The phrase "on-off-keying", as used herein, may include an amplitude-shift-keying (ASK) scheme, which may represent data, e.g., digital data, as the presence or absence of a carrier wave. The OOK signals may also be referred to as "un-modulated signals". For example, the presence of a carrier, e.g., for a predefined duration, may represent a first value, e.g., the binary value "1", while the absence of the carrier for the same duration may represent a second value, e.g., the binary value "0".

Although some demonstrative embodiments are described herein with respect to communicating ranging information in the form of OOK signals, in other embodiments the ranging information may be communicated using any other ASK scheme or any other keying or coding scheme.

In some demonstrative embodiments, optical communication unit 112 may also include a controller 111 to control light sources 116 and/or light receivers 118, e.g., as described below.

In some demonstrative embodiments, positioning system 110 may also include a processor 114 to process communications performed by optical communication unit 112, for example, to determine positioning information corresponding to vehicle 102, e.g., as described below.

In some demonstrative embodiments, controller 111 may be implemented as part of optical communication unit 112. In other embodiments, controller 111 may be implemented as part of processor 114 or as part of any other element of positioning system 110.

In some demonstrative embodiments, processor 114 and optical communication unit 112 may be implemented as separate elements of positioning system 110. In other embodiments, processor 114 and optical communication unit 112 may be implemented as part of a common element of positioning system 110.

In some demonstrative embodiments, processor 114 may interact with and/or control one or more vehicle control units 120, which may control one or more vehicle components 124 of vehicle 102.

In some demonstrative embodiments, vehicle components 124 may include, for example, one or more components controlling the velocity and/or acceleration of the vehicle, e.g., motor components, brake components, parking components, transmission components, fuel supply components, clutch components, and the like, one or more steering components controlling a direction of the vehicle, e.g., wheel steering components, one or more signaling components, e.g., signaling lights, warning lights, brake lights, and the like, and/or any other element or component of the vehicle.

In some demonstrative embodiments, processor 114 may interact with or control one or more vehicle input/output control units 122, which may control one or more User Interface (UI) components 126 of vehicle 102.

In some demonstrative embodiments, UI components 126 may include, for example, an input device, an output device, or input and output device that can be used by a user to communicate with processor 114. For example, UI components 126 may include a touch panel, a touch-screen, a touch-pad, a keyboard, a keypad, a microphone, a display, a speaker, a switch, a visual indicator, an audio indicator, a tactile indicator, a speech to text engine, and the like.

In some demonstrative embodiments, UI components 126 may be used by a user, such as a driver of the vehicle 102, to selectively activate or deactivate positioning system 110, to control processor 114 to provide one or more control signals to the one or more vehicle control units 120, and/or to control the one or more vehicle components 124.

In some demonstrative embodiments, processor 114 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller.

In some demonstrative embodiments, processor 114 may be part of a general vehicle main computer system of vehicle 102. The main computer system may, for example, manage various aspects of the operation of the vehicle, such as engine control, transmission control, and various component controls.

In some demonstrative embodiments, positioning system 110 may also include a memory 113 to store information processed by processor 114. Memory 113 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit and/or other suitable memory units.

In some demonstrative embodiments, the determined position of vehicle 102 may be utilized to facilitate cooperative driving, collision avoidance, and/or collision warning functionalities.

In one example, processor 114 may output the determined position to the one or more vehicle control units 120, which may, in turn, control the one or more vehicle components 124 to alter a velocity or an acceleration of the vehicle 102 to initiate collision avoidance or collision safety measures, or to provide a warning indication to a user of the vehicle 102 and/or to a user of the vehicle 104.

In another example, processor 114 may output the determined position to the one or more input/output control units 122, which, in turn, may control user interface 126 to provide a user, e.g., driver, of the vehicle 102 with an indication of the determined position and one or more potential warning indications. The user interface 126 may also provide the user of the vehicle 102 with functionality that allows the user to control the one or more vehicle components 124 via the one or more vehicle control units 120 based on the determined position.

In some demonstrative embodiments vehicles 102 and/or 104 may be configured to communicate according to a communication protocol, e.g., as described in detail below.

In some demonstrative embodiments, the communication protocol may be configured to allow, for example, one-way positioning communications and/or two-way positioning communications over a predefined frequency scheme, e.g., as described below.

In some demonstrative embodiments, the communication protocol may be configured to enable a positioning system, e.g., positioning system 110, of a vehicle, e.g., vehicle 102, to dynamically switch between one-way ranging and two-way ranging, and/or to communicate ranging signals with positioning systems of one or more other vehicles, e.g., vehicle 104.

In some demonstrative embodiments, the communication protocol may be configured to reduce and/or avoid, at least partially, effects of interference, e.g., reflective interference or other interference, between communications performed by a light source of the positioning system and signals communicated by one or more other light sources, e.g., other light sources of the same positioning system and/or light sources of other positioning systems.

In some demonstrative embodiments, vehicles 102 and/or 104 may be configured to communicate the ranging information via vehicle-positioning packets having a predefined format, e.g., as described below.

Some demonstrative embodiments are described herein with respect to vehicle-positioning packets communicated by one or more vehicles. However, other embodiments may include communicating one or more positioning packets communicated by one or more non-vehicular devices, e.g., one or more mobile devices. In one example, the positioning packets may be communicated by one or more devices, e.g., to determine a positioning of the one or more devices.

In some demonstrative embodiments, the vehicle-positioning packets may be configured to communicate ranging signals, e.g., in the form of OOK signals, in combination with other information, which may be related to and/or associated with the ranging signals, e.g., as described below.

In some demonstrative embodiments, optical communication unit 112 may be configured to communicate IM optical signals of a vehicle-positioning packet including a first portion including information modulated over a first frequency band (also referred to as "data frequency band"), and a second portion including OOK signals, e.g., to be used for one-way or two way ranging, over a second frequency band, which is different from the first frequency band.

In some demonstrative embodiments, one-way ranging signals may be communicated over a first ranging frequency band ("one-way ranging frequency"), and two-way ranging signals may be communicated over a second ranging frequency band ("two-way ranging frequency"), which may be different from the first ranging frequency band, e.g., as described below.

In some demonstrative embodiments, optical communication unit 112 may select between the first and second ranging frequency band for communicating the OOK signals, for example, based on a type of the OOK signals.

In one example, optical communication unit 112 may select the first ranging frequency band, for example, if the OOK signals include two-way positioning signals. Optical communication unit 112 may select, for example, the second ranging frequency band, if the OOK signals include one-way positioning signals.

Some demonstrative embodiments are described herein with respect to communicating the one-way positioning signals and the two-way positioning signals over two separate frequency bands. However, in other embodiments, the one-way positioning signals and the two-way positioning signals may be communicated over the same frequency band or over two partially overlapping bands.

In some demonstrative embodiments, the first frequency band, which may be used for communicating the first portion of the packet, may be between the first and second ranging frequency bands, which may be used for communicating the second portion of the packet.

Figure 5:
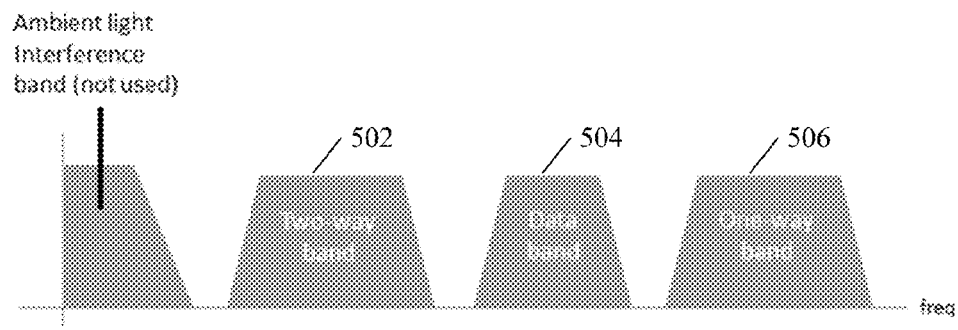
FIG. 5 is a schematic illustration of a frequency band scheme, in accordance with some demonstrative embodiments.

In some demonstrative embodiments, the first ranging frequency band, which may be used for communicating two-way positioning signals, may include frequencies equal to or less than 20 Megahertz (MHz); the second ranging frequency band, which may be used for communicating one-way positioning signals, may include frequencies equal to or greater than 40 MH; and/or the first frequency band, which may be used for communicating the first portion of the packet, may include frequencies between 20 MHz and 40 HZ, for example 30 MHz, e.g., as described below with reference to FIG. 5.

In other embodiments, the first frequency band for communicating the first portion of the packet, the first ranging frequency band and/or the second ranging frequency band may include any other suitable frequency bands according to any other frequency scheme. For example, the first frequency band for communicating the first portion of the packet may be lesser than or greater than the first and/or second ranging frequency bands, and/or the first ranging frequency band may be greater than and/or lesser than the second ranging frequency band.

In some demonstrative embodiments, the information of the first portion of the vehicle-positioning packet may be modulated according a non-ASK scheme. In one example, the information of the first portion of the vehicle-positioning packet may be modulated by Binary-Phase-Shift-Keying (BPSK), or any other modulation scheme.

In some demonstrative embodiments, the first portion of the vehicle-positioning packet, which may be communicated over the first frequency band, may include an indication of the ranging frequency band, which may be used for communicating the OOK signals.

In some demonstrative embodiments, communicating over the first frequency band an indication of the ranging frequency band may enable, for example, a positioning system, e.g., positioning system 110, of a vehicle, e.g., vehicle 102, to indicate the ranging frequency to one or more vehicles, e.g., vehicle 104.

In some demonstrative embodiments, the first portion of the vehicle-positioning packet may include a header field, which may include an indicator to indicate whether the OOK signals of the second portions are to be communicated over a first predefined band or a second predefined band. For example, the indicator may indicate whether the OOK are to be communicated over the one-way ranging frequency or the two-way ranging frequency.

In some demonstrative embodiments, the first portion of the vehicle-positioning packet may include a data field including data corresponding to a vehicle from which the vehicle-positioning packet is transmitted.

In some demonstrative embodiments, the data may include a location on the vehicle from which the vehicle-positioning packet is transmitted, a velocity of the vehicle, an acceleration of the vehicle, and/or any other information relating to one or more attributes of the vehicle or to the location of the vehicle, e.g., as described below.

In some demonstrative embodiments, ranging communications performed by an optical communication unit of a vehicle, e.g., optical communication unit 112 of vehicle 102, may be affected by interference and/or reflections of other ranging communications, e.g., other ranging communications performed by the optical communication unit and/or other ranging communications performed by other optical communication units of other vehicles.

In some demonstrative embodiments, the interference may be caused by one-way ranging signals communicated between a plurality of vehicles.

In one example, the plurality of vehicles may be involved in a one-way cooperative ranging process. For example, light source 116 may transmit signals 130 to vehicle 104, while another vehicle 105 may transmit signals 131 towards vehicle 102. According to this example, at least part of the signals 131 transmitted by the vehicle 105 may be reflected off vehicle 102 towards vehicle 104 in the form of reflected signals 133. As a result, the signals 133 reflected off vehicle 102 may cause interference to signals 130, when received at vehicle 104, e.g., if both signals 131 and 130 are transmitted over the same frequency band.

In some demonstrative embodiments, the interference may be caused by two-way ranging signals communicated by different light sources of a vehicle.

In one example, vehicle 102 may utilize a plurality of light sources 116 to illuminate object 106 with a plurality of signals 132, for example, such that light receiver 118 may process a plurality of reflections 134, e.g., as described above. Interference may occur at light receiver 118 between the reflections 134 of the plurality of signals 132, for example, if the plurality of signals 132 are transmitted over the same frequency.

In some demonstrative embodiments, the first portion of the vehicle-positioning packet, e.g., the data portion described below with reference to FIG. 6, may be communicated over a fixed, e.g., predefined, frequency, e.g., a frequency of 30 MHz as described below. The first portion of the vehicle-positioning packet may not be less susceptible to interference from other packets, for example, since a Signal-to-Noise (SNR) level for successful decoding of BPSK signals may be easily accommodated, e.g., even if there is reflective interference.

In some demonstrative embodiments, the ranging signals, e.g., of the ranging portions described below with reference to FIG. 6, may be more susceptible to interference, e.g., since a relatively high SNR level may be required.

In some demonstrative embodiments, optical communication unit 112 may be configured for communicating different ranging communications, e.g., of different vehicle-positioning packets, over different ranging frequencies, e.g., as described below.

In some demonstrative embodiments, optical communication unit 112 may communicate OOK signals of a first vehicle-positioning packet over a first ranging frequency within the ranging frequency band, and may communicate OOK signals of a second vehicle-positioning packet over a second ranging frequency within the ranging frequency band, wherein the second ranging frequency is different from the first ranging frequency, e.g., as described below.

In some demonstrative embodiments, the communication protocol may include an IM frequency hopping (FH) Spatial-Division-Multiple-Access (FH-SDMA) protocol. For example, controller 111 may select the ranging frequency to be used for communicating ranging signals of a vehicle positioning packet according to a predefined frequency hopping size, e.g., as described below.

In some demonstrative embodiments, controller 111 may randomly select the ranging frequency to be used for communicating ranging signals of the vehicle-positioning packet.

In other embodiments, controller 111 may select the ranging frequency to be used for communicating ranging signals of the vehicle-positioning packet according to any other selection scheme and/or criteria.

Figure 2A:
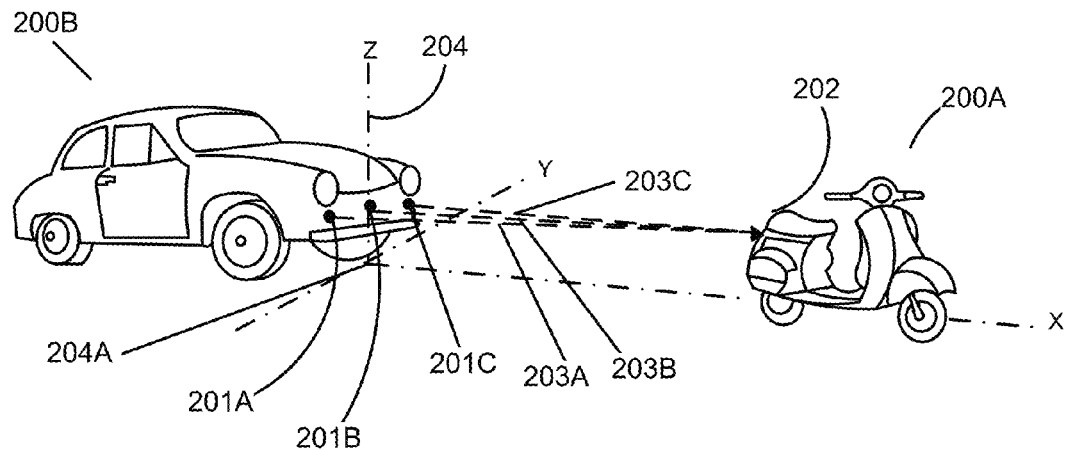
FIG. 2A is a schematic representation of an interaction between vehicles employing a one-way positioning system, in accordance with some demonstrative embodiments.

Reference is made to FIG. 2A, which schematically illustrates an interaction between vehicles employing a one-way positioning system in accordance with some demonstrative embodiments.

As shown in FIG. 2A, a first vehicle 200A may perform one-way positioning communication with a second vehicle 200B. For example, vehicle 200A may perform the functionality of vehicle 102 (FIG. 1) and/or vehicle 200B may perform the functionality of vehicle 104 (FIG. 1).

In some demonstrative embodiments, vehicle 200A may include a signal sensor 202, and vehicle 200B may include one or more signal transmitters ("sources"), e.g., including three signal sources 201A, 210B and 210C. For example, signal sensor 202 may perform the functionality of light receiver 118 (FIG. 1) and/or signal sources 201A, 201B and/or 201C may perform the functionality of light source 116 (FIG. 1).

As shown in FIG. 2A, signal sources 201A, 201B and 201C may be configured to emit signals that may travel along propagation paths 203A, 203B and 203C, respectively.

In some demonstrative embodiments, vehicle 200A may include one signal sensor 202 and vehicle 200B may include three signal sources 201A, 201B and 201C, e.g., as shown in FIG. 2A. However, in other embodiments, any other configurations may be implemented. For example, the vehicle 200B may include any number of signal sources and/or the vehicle 200A may include any number of signal sensors. In one example, vehicle 200B may include one or more additional groups of three signal sources, and/or vehicle 200A may include additional signal sensor(s), e.g., such that each group of three signal sources transmits signals to each signal sensor. Such configuration may enable, for example, determining multiple positions of a vehicle in relation to another vehicle, which may be used, for example, to determine angular deviations or displacements between vehicles.

Although the signal sources 201A, 201B and 201C are shown in FIG. 2A as being positioned at a front of the vehicle 200B, any other configuration of signal sources 201A, 201B and 201C may be used. For example, one or more additional signal sources may be positioned at the front, sides, roof, and/or rear of the vehicle 200B. Similarly, additional signal sensors may be positioned at the front, roof, sides, and/or rear of the vehicle 200A.

As shown in FIG. 2A, a coordinate system 204 may be defined in relation to the second vehicle 200B. The coordinate system 204 may have a center coordinate 204A located in proximity to the signal sources 201A, 201B and 201C, such as, for example, vertically beneath the signal source 201B. However, in other embodiments, the coordinate system 204 may be centered at any other spatial position.

In some demonstrative embodiments, the signal sensor 202 associated with vehicle 200A may be configured to detect the signals received from the signal sources 201A, 201B and 201C.

In some demonstrative embodiments, vehicle 200B may include a controller, e.g., controller 111 (FIG. 1), which may electrically control light sources 201A, 201B and 201C to synchronously emit pulsed signals, e.g., by turning light sources 201A, 201B and 201C on and off synchronously.

Figure 2B:
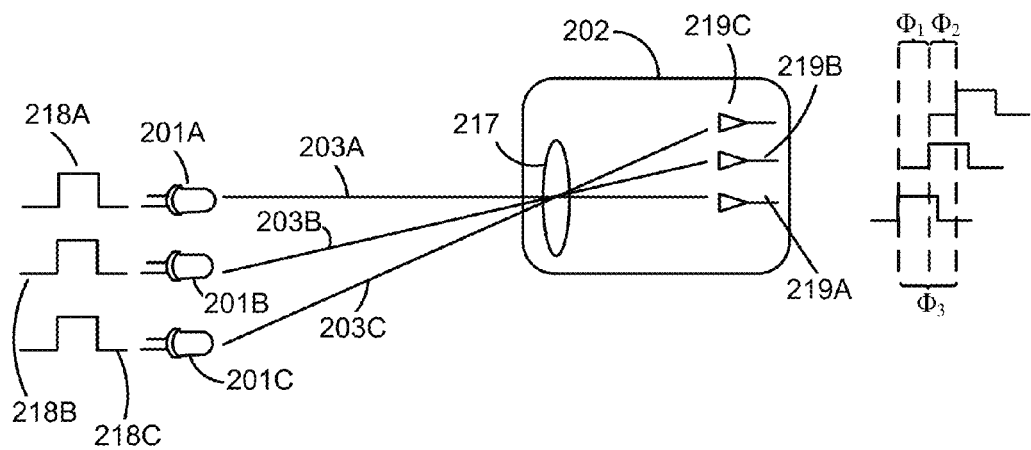
FIG. 2B is a schematic illustration of the transmission and receipt of signals by the vehicles of FIG. 2A, in accordance with some demonstrative embodiments.

FIG. 2B is a schematic illustration of the transmission and receipt of signals vehicles 200A and 200B, in accordance with some demonstrative embodiments.

In some demonstrative embodiments, controller 111 (FIG. 1) may control light sources 201A, 201B and 201C to transmit signals 218A, 218B and 218C, respectively, which may travel along propagation paths 203A, 203B and 203C, respectively.

In some demonstrative embodiments, the signals 218A, 218B and 218C may be modulated using any appropriate analog or digital modulation technique including, but not limited to, amplitude modulation (AM) such as, for example, amplitude-shift keying (ASK) modulation. In other embodiments, the signals 218A, 218B and 218C may be modulated using phase modulation such as, for example, one or more forms of phase-shift keying (PSK); frequency modulation such as, for example, one or more forms of frequency-shift keying (FSK); quadrature amplitude modulation (QAM); or any other modulation technique.

In some demonstrative embodiments, one or more sub-carrier signals may be added to each of the signals 218A, 218B and/or 218C, and the sub-carrier signal(s) may be phase modulated or frequency modulated.

In some demonstrative embodiments, the sub-carrier signals may be modulated with orthogonal frequency-division multiplexing (OFDM). In one example, controller 111 (FIG. 1) may control signal sources 201A, 201B and 201C to operate in a pulsed manner, e.g., to generate high frequency ON and OFF keyed waveforms.

In some demonstrative embodiments, signals 218A, 218B and 218C may be modulated at a frequency that is high enough to permit a positioning technique to be used to analyze the signals, but not so high as to cause phase aliasing. For example, phase aliasing may occur, e.g., if a time of flight of the signals 218A, 218B and/or 218C exceeds half of the period of the signals.

In some demonstrative embodiments, the signals 218A, 218B and 218C emitted by the signal sources 201A, 201B and 201C may reach the signal sensor 202 at different times, e.g., since the propagation paths along which the signals 218A, 218B and 218C travel may vary in length.

In some demonstrative embodiments, signal sensor 202 include a non-imaging sensor array including an optical lens 217 and an array of pixel sensors 219A, 219B and 219C. As shown in FIG. 2B, signals 218A, 218B and 118C may converge on one side of the lens 217 and may be spatially separated on an opposing side of the lens 217. As also shown in FIG. 2B, each pixel sensor 219A, 219B and 219B may detect a respective corresponding signal of the signals 218A, 218B and 218C.

In some demonstrative embodiments, phase shifts ("phase differences") may be measured between the signals 218A, 218B and 218C as received by signal sensor 202, e.g., at pixel sensors 219A, 219B and 219C.

For example, as shown in FIG. 2B, a phase shift, denoted $\phi 1$, may be measured between the signal 218A and the signal 218B, a phase shift, denoted $\phi 2$, may be measured between the signal 218B and the signal 218C, and/or a phase shift, denoted $\phi 3$, may be measured between the signal 218A and the signal 218C.

In other embodiments, signal sensor 202 may include any other signal sensor, e.g., an imaging sensor array having a suitable pixel density, or a scanning array that has a sufficiently high frame rate capable of sampling the frequencies of the signals 218A, 218B and 218C, e.g., such that the phase shifts between the signals may be determined at receipt by the signal sensor 202.

In some demonstrative embodiments, the phase shift, denoted $\phi$, in radians, between two signals may be related to a time delay difference, denoted $\tau$, in receipt of the signals at signal sensor 202, e.g., resulting from the different propagation paths taken by the signal. For example, the phase shift $\phi$ may be related to the time difference $\tau$, e.g., as follows:

$$\phi = 2*\pi*f*\tau \qquad (1)$$

wherein f denotes a frequency of the IM signals.

In some demonstrative embodiments, a processor, e.g., processor 114 (FIG. 1) may be configured to determine time delays between the pairs of signals 281A, 218B and 218C based on measured phase shifts φ1, φ2, φ3 between the pairs of signals 218A, 218B and 218C. For example, processor 114 (FIG. 1) may determine a set of time values, e.g., including time delay values τ1, τ2, and τ3, representing a difference in a time of receipt or detection at the signal sensor 202 of the signals 218A and 218B, the signals 218B and 218C, and the signals 218A and 218C, respectively.

In some demonstrative embodiments, processor 114 (FIG. 1) may be configured to generate a set of distance expressions. For example, each distance expression may represent a distance between one of the signal sources 201A, 201B and 201C and the signal sensor 202. Processor 114 (FIG. 1) may be configured to determine a set of distance equations based on the set of distance expressions and the set of time values.

In some demonstrative embodiments, processor 114 (FIG. 1) may be configured to solve the set of distance equations to determine a position of the first vehicle 200A (e.g., a position of the signal sensor 202) within the coordinate system 204 defined in relation to the second vehicle 200B, or more specifically, in relation to the signal sources 201A, 201B and 201C.

In some demonstrative embodiments the determined position may be utilized to facilitate cooperative driving, collision avoidance, and/or collision warning functionalities. In one example, processor 114 (FIG. 1) may output the determined position to the one or more vehicle control units 120 (FIG. 1), which may, in turn, control the one or more vehicle components 124 (FIG. 1) to alter a velocity or an acceleration of the vehicle 200A (FIG. 2A) to initiate collision avoidance or collision safety measures and/or to provide a warning indication to a user of the vehicle 200A (FIG. 2A) or to a user of the vehicle 200B (FIG. 2A). In another example, processor 114 (FIG. 1) may output the determined position to the one or more input/output control units 122 (FIG. 1), which, in turn, may control a user interface 126 (FIG. 1) to provide a user (e.g., driver) of the vehicle 200A (FIG. 2A) with an indication of the determined position and one or more potential warning indications. The user interface 126 (FIG. 1) may also provide the user of the vehicle 200A (FIG. 2A) with functionality that allows the user to control the one or more vehicle components 124 (FIG. 1) via the one or more vehicle control units 120 (FIG. 1) based on the determined position.

Figure 3A:
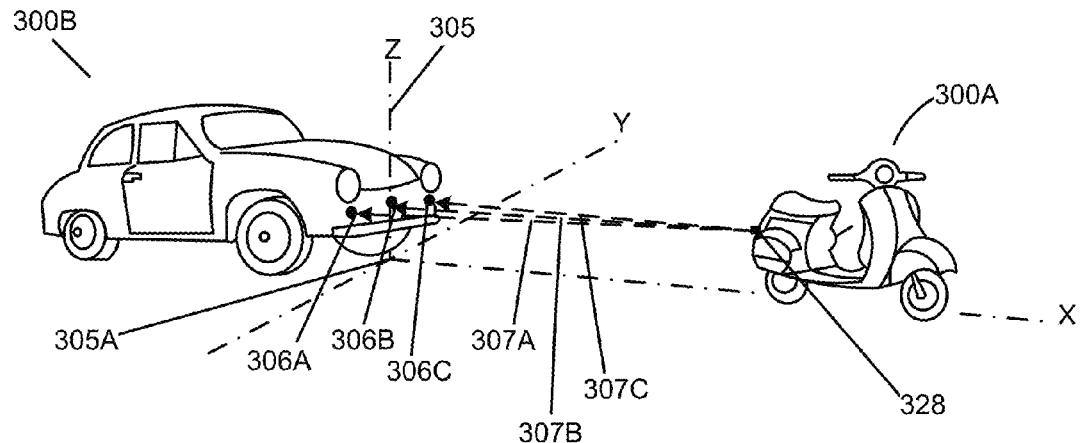
FIG. 3A is a schematic representation of an interaction between vehicles employing a one-way positioning system, in accordance with some demonstrative embodiments.
Figure 3B:
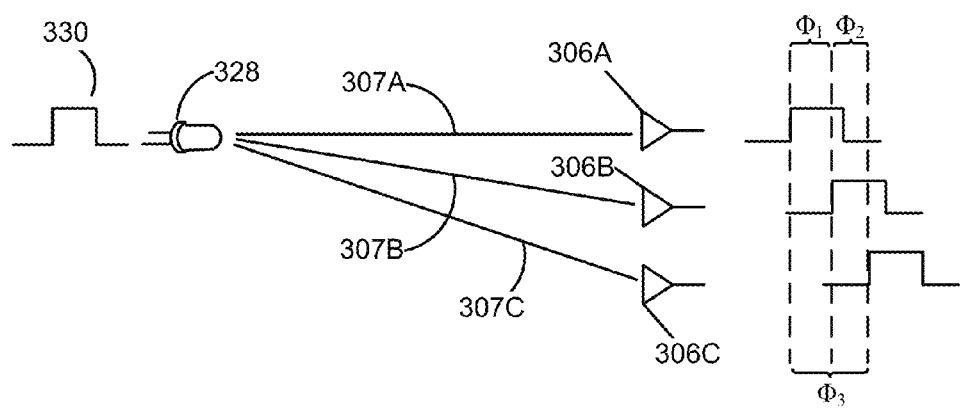
FIG. 3B is a schematic illustration of the transmission and receipt of signals by the vehicles of FIG. 3A, in accordance with some demonstrative embodiments.

FIG. 3A is a schematic representation of an interaction between vehicles 300A and 300B employing a one-way positioning system, in accordance with some demonstrative embodiments. FIG. 3B is a schematic illustration of the transmission and receipt of signals by the vehicles 300A and 300B, in accordance with some demonstrative embodiments. For example, vehicle 300A may perform the functionality of vehicle 104 (FIG. 1) and/or vehicle 300B may perform the functionality of vehicle 102 (FIG. 1).

In some demonstrative embodiments, vehicle 300A may have a signal source 328 configured to emit a signal 330, and vehicle 300B may have three signal sensors 306A, 306B and 306C to receive the signal 330 via three paths 307A, 307B and 307C. For example, signal source 328 may perform the functionality of light source 116 (FIG. 1) and/or signal sensors 306A, 306B and 306C may perform the functionality of slight receiver 118 (FIG. 1).

In some demonstrative embodiments, a coordinate system 305 may be defined in relation to the first vehicle 300B. The coordinate system 305 may have a center coordinate 305A located in proximity to the signal sensors 306A, 306B and 306C, such as, for example, vertically beneath the signal sensor 306B. The coordinate system 305 may be centered at any spatial position within relative proximity of the signal sensors 306A, 306B and 306C.

In some demonstrative embodiments, the signal 330 emitted by the signal source 328 may travel along propagation paths 307A, 307B and 307C, and may reach the signal sensors 306A, 306B and 306C at different times. Phase shifts between the signal 330 received by each of the signal sensors 306A, 306B and 306C may be determined, e.g., as described above. A processor, e.g., processor 114 (FIG. 1) may determine a set of time values based on the measured phase shifts, e.g., as described above.

Figure 4A:
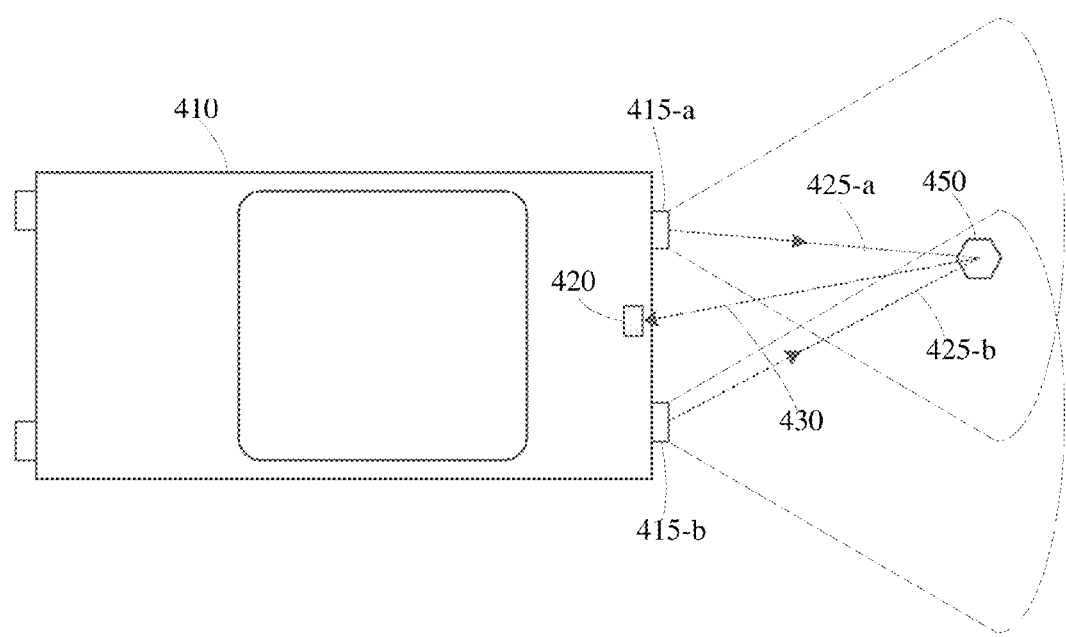
FIG. 4A is a schematic representation of a vehicle employing a two-way positioning system, in accordance with some demonstrative embodiments.

FIG. 4A is a schematic representation of a vehicle 410 employing a two-way positioning system, in accordance with some demonstrative embodiments. For example, vehicle 410 may perform the functionality of vehicle 102 (FIG. 1).

In some demonstrative embodiments, vehicle 410 may include a first light source 415-a, which may be, for example, integrated into a first taillight of the vehicle 410, and a second light source 415-b, which may be, for example, integrated into a second taillight of the vehicle 410. Vehicle 410 may also include a light receiver 420, which may be, for example, mounted in a fixed and known location, e.g., near the rear of the vehicle 410. In one example, light sources 415-a and/or 415-b may perform the functionality of light sources 116 (FIG. 1), and/or light receiver 420 may perform the functionality of light receiver 118 (FIG. 1).

In some demonstrative embodiments, an object 450 may be located behind the vehicle 415. The first light source 415-a may emit modulated light 425-a, which may bounce off the object 450 and may be reflected 430 back to the light receiver 420 where it may be received and processed. Similarly, the second light source 415-a may emit modulated light 425-b, which may bounce off the object 450 and may be reflected 430 back to the light receiver 420 where it may be received and processed.

Figure 4B:
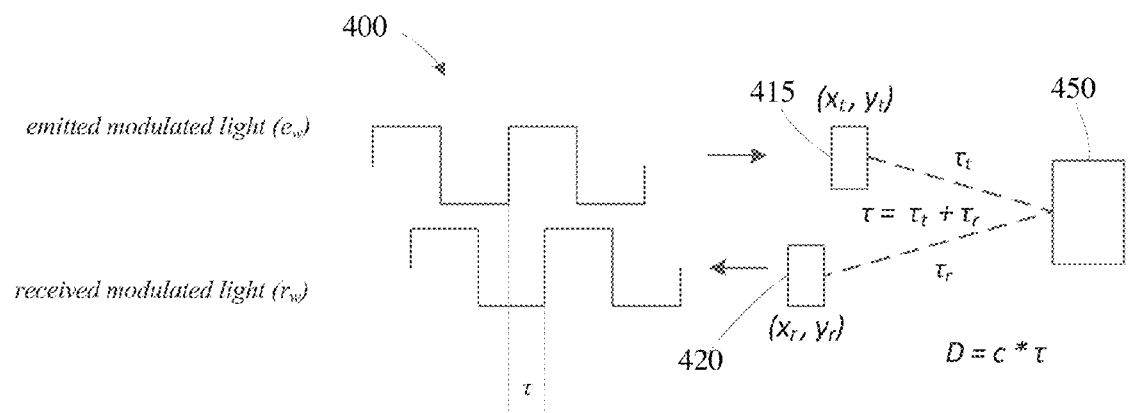
FIG. 4B is a schematic illustration of the transmission and receipt of signals by the vehicle of FIG. 4A, in accordance with some demonstrative embodiments.

FIG. 4B is a schematic illustration of the transmission and receipt of signals by the vehicle 410, in accordance with some demonstrative embodiments.

As shown in FIG. 4B, a waveform 400 may represent an OOK ranging tone being reflected off object 450. The waveform 400 may be high when on and low when off. The first light source 415-a located at a known and fixed position, denoted $(x_t, y_t)$, may emit the modulated waveform 400 which may strike the object 450 and be reflected to the light receiver 420 at a known and fixed position, denoted $(x_r, y_r)$. It may take a certain time, denoted $\tau_t$, for the emitted light to reach the object and another time, denoted $\tau_r$, to reach the light receiver 420. A total time delay, denoted $\tau$, from light source 415-a to light receiver 420 may be, for example, represented by $\tau = \tau_t + \tau_r$. The time delay $\tau$ is graphically shown in FIG. 4A as the phase difference of the emitted waveform, denoted $e_w$ as compared to the received waveform, denoted $r_w$.

In some demonstrative embodiments, the distance, denoted D, from the light source 415-a to the object 450 and back to the light receiver 420 may be, for example, calculated as follows:

$$D = c^*\tau \qquad (2)$$

wherein c denotes the speed of light.

While not shown in FIG. 4B, a similar analysis may be performed with respect to light emitted from the second light source 415-b.

In some demonstrative embodiments, a relative positioning between vehicle 410 and object 450 may be determined, based on, for example, on the location of light source 415-*a*, the location of light source 415-*b*, the location of light receiver 420, and the distance D determined with respect to the light emitted by light source 415-*a* and the distance D determined with respect to the light emitted by light source 415-*b*.

Reference is now made to FIG. 5, which is a schematic illustration of a frequency band scheme 500, in accordance with some demonstrative embodiments. For example, one or more elements of system 100 (FIG. 1), e.g., optical communication unit 112 (FIG. 1), light source 116 (FIG. 1) and/or light receiver 118 (FIG. 1), may communicate signals, e.g., of vehicle-positioning packets over sub-carrier frequencies of frequency band scheme 500.

In some demonstrative embodiments, frequency band scheme 500 may include three different modulation frequency bands of operation, e.g., as described below.

In some demonstrative embodiments, frequency band scheme 500 may include a frequency band ("one-way ranging band") 506 for communicating one-way ranging signals. For example, optical communication unit 112 (FIG. 1) may communicate one-way ranging signals over frequency band 506, e.g., as described above. In one example, frequency band 506 may include a frequency band equal to or greater than 40 MHz. In other embodiments, frequency band 506 may include any other frequency band.

In some demonstrative embodiments, frequency band scheme 500 may include a frequency band ("two-way ranging band") 502 for communicating two-way ranging signals. For example, optical communication unit 112 (FIG. 1) may communicate two-way ranging signals over frequency band 502, e.g., as described above. In one example, frequency band 502 may include a frequency band equal to or lesser than 20 MHz. In other embodiments, frequency band 502 may include any other frequency band.

In some demonstrative embodiments, frequency band scheme 500 may include a frequency band ("data band") 504 for communicating data, e.g., the first portion of the vehicle-positioning packet, as described above. For example, optical communication unit 112 (FIG. 1) may communicate information over frequency band 504, e.g., as described above. In one example, frequency band 504 may include a frequency band between frequency bands 502 and 506, e.g., a frequency band having a center frequency of about 30 MHz. In other embodiments, frequency band 504 may include any other frequency band.

In other embodiments, bands 502, 504 and/or 506 may include any other bands and/or bands 502, 504 and/or 506 may be arranged according to any other order.

In some demonstrative embodiments, signals communicated over frequency bands 502 and 506 may include OOK signals, e.g., as described above.

In some demonstrative embodiments, signals communicated over frequency band 504 may include subcarrier modulated BPSK signals.

In some demonstrative embodiments, a data bit rate of the data communicated over frequency band 504 may be related to the subcarrier frequency used for communicating the data, for example, such that there may be an even integer number of cycles of subcarriers per bit.

Figure 6:
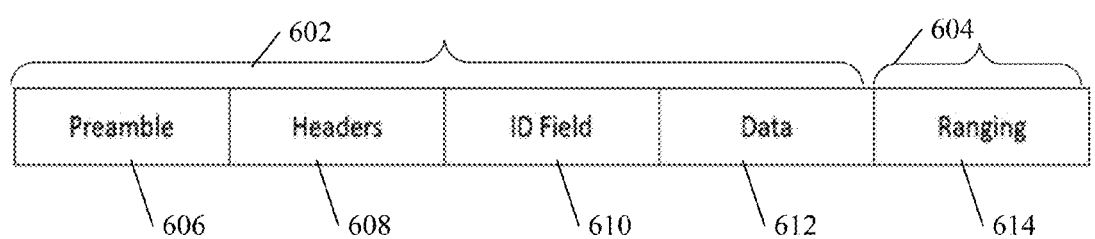
FIG. 6 is a schematic illustration of a vehicle-positioning packet, in accordance with some demonstrative embodiments.

Reference is made to FIG. 6, which schematically illustrates a vehicle-positioning packet 600, in accordance with some demonstrative embodiments. For example, optical communication unit 112 (FIG. 1), light source 116 (FIG. 1) and/or light receiver 118 (FIG. 1) may communicate vehicle-positioning packet 600.

In some demonstrative embodiments, packet 600 may include a first portion 602 ("data portion") and a second portion 604 ("ranging portion").

In some demonstrative embodiments, portion 602 may be communicated over a first frequency band, and portion 604 may be communicated over a second frequency band, different from the first frequency band. For example, portion 602 may be communicated over data frequency band 504 (FIG. 5), and portion 604 may be communicated over a ranging frequency band, e.g., frequency band 502 or 506 (FIG. 5).

In some demonstrative embodiments, portion 604 may include ranging signals 614, for example, one way ranging signals or two-way ranging signals, e.g., as described above.

In some demonstrative embodiments, portion 604 may be communicated over band 502 (FIG. 5), e.g., if ranging signals 614 include two-way ranging signals, or over band 506 (FIG. 5), e.g., if ranging signals 614 include one-way ranging signals.

In some demonstrative embodiments, portion 602 may be modulated according to a BPSK modulation scheme and portion 604 may include un-modulated subcarriers, e.g., according to an OOK scheme, as described above.

In some demonstrative embodiments, portion 602 may include a preamble field 606, e.g., including synchronization information for synchronizing between a transmitter and a receiver of packet 600.

In some demonstrative embodiments, portion 602 may include one or more header fields 608. Header 608 may include, for example, information ("protocol information") relating to the communication of portion 604.

In one example, header 608 may include an indicator of a type of signals to be communicated in portion 604, for example, whether signals 614 are to be used for one-way positioning, e.g., between vehicles, or for two-way positioning, e.g., involving a single vehicle. For example, an optical communication unit, e.g., optical communication unit 112 (FIG. 1), which may receive packet 600, may be able to tune a light receiver, e.g., light receiver 118 (FIG. 1), based on header 608.

In some demonstrative embodiments, header 608 may include an indication of the ranging frequency to be used for communicating ranging signals 614. For example, ranging signals 614 may be communicated over a ranging frequency, which may be different, e.g., for every packet transmission, as described below.

In one example, header 608 may include an indication of a selected ranging frequency within frequency band 502 (FIG. 5) to be used for two-way ranging communication, and controller 111 (FIG. 1) may tune light receiver 118 (FIG. 1) to the selected two-way ranging frequency indicated by header 608.

In another example, header 608 may include an indication of a selected ranging frequency within frequency band 506 (FIG. 5) to be used for one-way ranging communication, and controller 111 (FIG. 1) may tune light receiver 118 (FIG. 1) to the selected one-way ranging frequency indicated by header 608.

In some demonstrative embodiments, portion 602 may include an identifier (ID) field 610 to identify a transmitter of packet 600. For example, ID field 610 may include a unique identifier, e.g., a Vehicle Identifier Number (VIN) of a vehicle, e.g., vehicle 102 (FIG. 1), including from which packet 600 is transmitted.

In some demonstrative embodiments, portion 602 may include a data field 612 includes payload information to be communicated between a transmitter of packet 600 and a receiver of packet 600. In one example, data field 612 may include a location on the vehicle, e.g., of light source 116 (FIG. 1), from which packet 600 is transmitted, a velocity of the vehicle, e.g., vehicle 102 (FIG. 1), from which packet 600 is transmitted, an acceleration of the vehicle, e.g., vehicle 102 (FIG. 1), from which packet 600 is transmitted, and/or any other information.

In some demonstrative embodiments, optical communication unit 112 may be configured to perform frequency hopping, e.g., on a per packet basis or for every other number of packets.

In some demonstrative embodiments, controller 111 (FIG. 1) may control light transmitter 116 (FIG. 1) to transmit ranging field portion 604 of packet 600 at a frequency having a frequency offset with respect to a center frequency of the ranging frequency band, e.g., one-way frequency band 506 (FIG. 5) or two-way frequency band 502 (FIG. 5).

In some demonstrative embodiments, a frequency ("operating frequency"), denoted $F_{op}$, for communicating ranging signals, e.g., signals 614, of a vehicle-positioning packet, e.g., packet 600, may be determined, e.g., by controller 111 (FIG. 1), based on a predefined frequency hop size, denoted $\Delta F$, e.g., as follows:

$$F_{op} = F_C + \alpha \cdot \Delta_F \quad (3)$$

wherein $F_c$ denotes the band center frequency of the ranging frequency band, wherein $\alpha$ denotes an integer selected from an integer set $\langle -k \ldots k \rangle$, and wherein k denotes an integer relating to the number of hopping frequencies. Fore example, the value of $\alpha$ may be selected from the set $\langle -k \ldots k \rangle$, e.g., randomly.

In some demonstrative embodiments, the frequency hopping may be implemented to avoid, for example, long-term effects of reflected interference. For example, positioning calculations relating to the positioning of a vehicle, e.g., vehicle 102 (FIG. 1), may based on a weighted average of a plurality of measurements, e.g., using a plurality of vehicle-positioning packets 600. The frequency hopping may, for example, circumvent negative effects of a packet 600 being corrupted by interference. For example, Kalman filtering and/or other techniques and/or discarding of outlier readings, may enable mitigating the effect of the interference.

In some demonstrative embodiments, slow frequency hopping for one-way ranging may be performed, for example, by controlling, e.g., by controller 111 (FIG. 1), all the light sources, e.g., light sources 116 (FIG. 1), to transmit on the same hopped frequency within ranging frequency band 506 (FIG. 5). The actual frequency of operation may be indicated, for example, as part of header field 608, e.g., as described above.

In some demonstrative embodiments, slow frequency hopping for one-way ranging may be performed, for example, by controlling, e.g., by controller 111 (FIG. 1), each light source, e.g., each of light sources 116 (FIG. 1), to transmit on a unique frequency within ranging frequency band 502 (FIG. 5).

In one example, controller 111 (FIG. 1) may control each light source 116 (FIG. 1) to operate at a fixed frequency offset from a fixed system center frequency.

In another example, controller 111 (FIG. 1) may control each light source 116 (FIG. 1) to operate at a unique frequency randomly selected from a set of frequencies.

Figure 7:
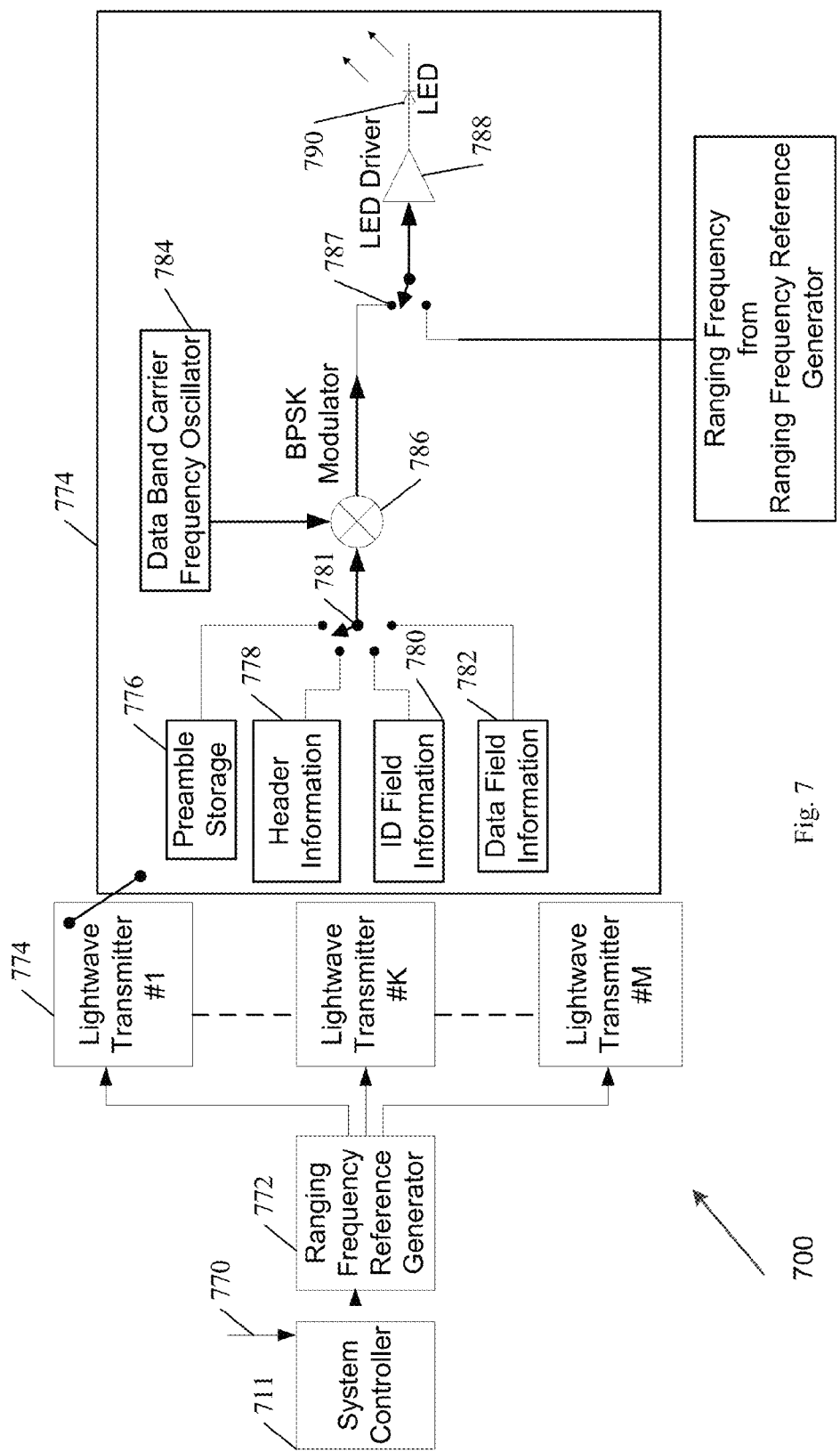
FIG. 7 is a schematic illustration of an optical transmitter, in accordance with some demonstrative embodiments.

Reference is made to FIG. 7, which schematically illustrates an optical transmitter 700, in accordance with some demonstrative embodiments. For example, optical transmitter 700 may perform the functionality of optical communication unit 112 (FIG. 1) for transmitting a vehicle-positioning packet, e.g., packet 600 (FIG. 6).

In some demonstrative embodiments, optical transmitter 700 may include one or more lightwave transmitters 774. For example, lightwave transmitter may perform the functionality of light sources 116 (FIG. 1).

In some demonstrative embodiments, optical transmitter 700 may include a ranging frequency reference generator 772 to generate one or more ranging frequencies to be used by the one or more lightwave transmitters 774, e.g., as described above.

In some demonstrative embodiments, a lightwave transmitter 774 may include a memory 776 to store information of preamble field 606 (FIG. 6), a memory 778 to store information of header field 608 (FIG. 6), a memory 780 to store information of ID field 610 (FIG. 6), and/or a memory 782 to store information of data field 612 (FIG. 6).

In some demonstrative embodiments, the lightwave transmitter 774 may include a BPSK modulator 786 to modulate the data of memories 776, 778, 780 and/or 782 over a data band frequency, e.g., within frequency band 504 (FIG. 5), which may be generated by a data band frequency oscillator 784.

In some demonstrative embodiments, the lightwave transmitter 774 may include a LED driver 788 to drive a LED 790 to transmit IM signals of packet 600 (FIG. 6).

In some demonstrative embodiments, optical transmitter 700 may be controlled by a controller 711. For example, controller 711 may perform the functionality of controller 111 (FIG. 1).

In some demonstrative embodiments, controller 711 may control optical transmitter 700 based, for example, on system input 770, e.g., received from one or more elements of vehicle 102 (FIG. 1). System input may include, for example, information of an operating band to be used, e.g., one-way or two-way ranging; a band operating frequency; the vehicle VIN; and/or the data of fields 606, 608, 610 and/or 612 (FIG. 6), e.g., as described above.

In some demonstrative embodiments, controller 711 may select the ranging reference frequency to be used by a k-th lightwave transmitter 774. For example, controller 711 may select the ranging reference frequency to be in band 502 (FIG. 5) or band 506 (FIG. 5).

In some demonstrative embodiments, controller 711 may select the specific ranging frequency within the selected frequency band to be used by the k-th lightwave transmitter 774, e.g., as described above.

In some demonstrative embodiments, controller 711 may select data from memories 776, 778, 780 and/or 782, e.g., sequentially, to be communicated as part of data portion 602 (FIG. 6). For example, controller 711 may control a switch 781 to select between memories 776, 778, 780 and/or 782.

In some demonstrative embodiments, controller 711 may control LED 790 to transmit the fields of portion 602 (FIG. 6) followed by the ranging signals 614 (FIG. 6) of portion 602 (FIG. 6). For example, controller 711 may control a switch 787 to provide the modulated BPSK signals generated by modulator 786 to LED driver 788, and to provide the ranging frequencies from generator 772 to LED driver 788, e.g., after the modulated BPSK signals.

Figure 8:
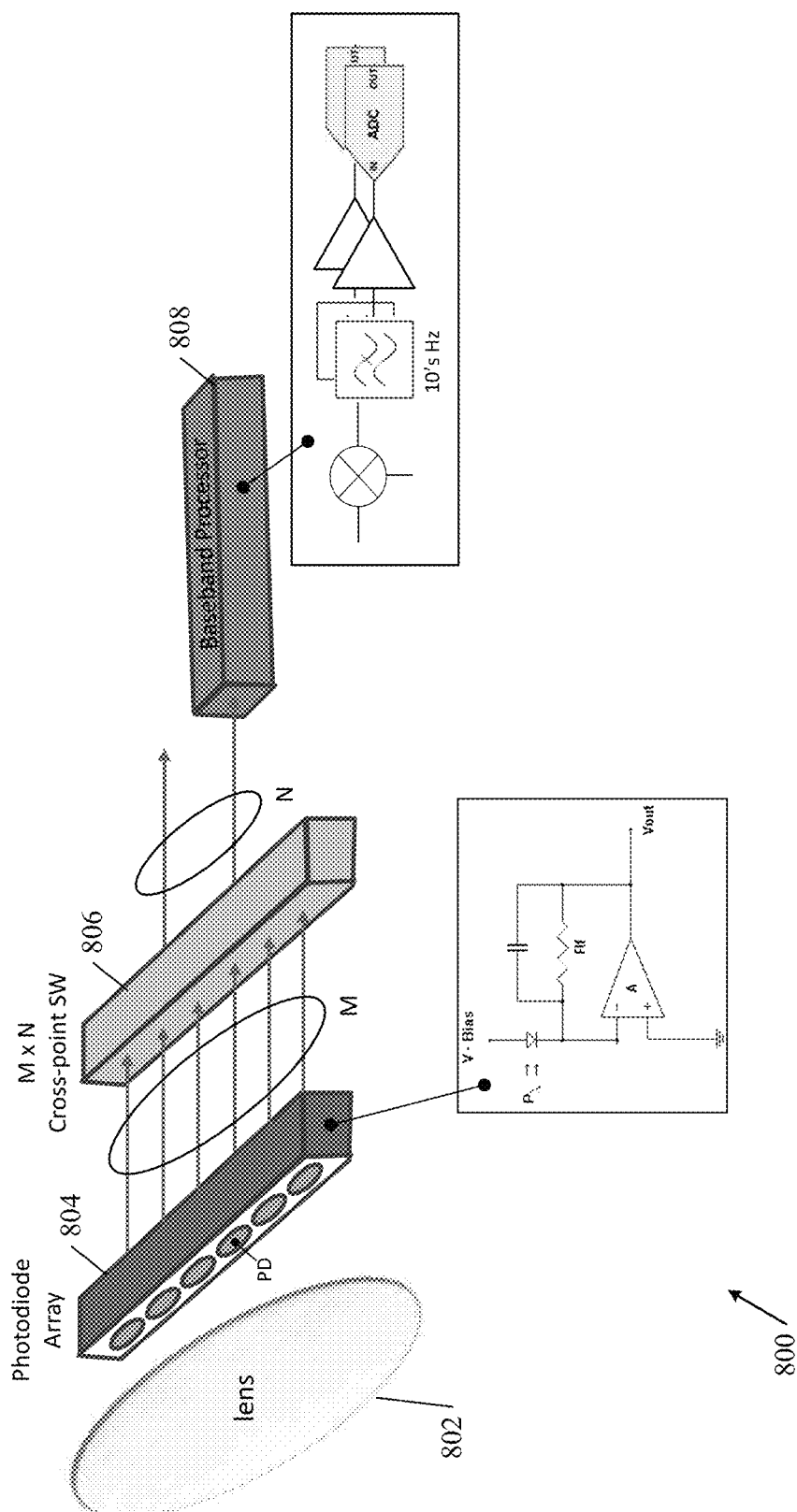
FIG. 8 is a schematic illustration of an optical receiver, in accordance with some demonstrative embodiments.

FIG. 8 is a schematic illustration of an optical receiver 800, in accordance with some demonstrative embodiments. For example, optical receiver 800 may perform the functionality of optical communication unit 112 (FIG. 1) for receiving a vehicle-positioning packet, e.g., packet 600 (FIG. 6).

In some demonstrative embodiments, optical receiver 800 may include an angle of arrival differentiating lens 802 followed by a non-imaging photodiode array 804. Array 804 may include multiple pixels, e.g., wherein each pixel may be able to ingest a complete packet of data.

In some demonstrative embodiments, optical receiver 800 may include a pixel processor 806 to scan the pixels of array 804 for pixels having active energy. Upon detecting a pixel having active energy, pixel processor 806 may assign the detected pixel to a base band processor 808 for processing of the modulated signal received by the pixel. For example, optical receiver 800 may include a predefined number, denoted N, of baseband processors 808. In one example, controller 111 (FIG. 1) may perform the functionality of pixel processor 806.

Figure 9:
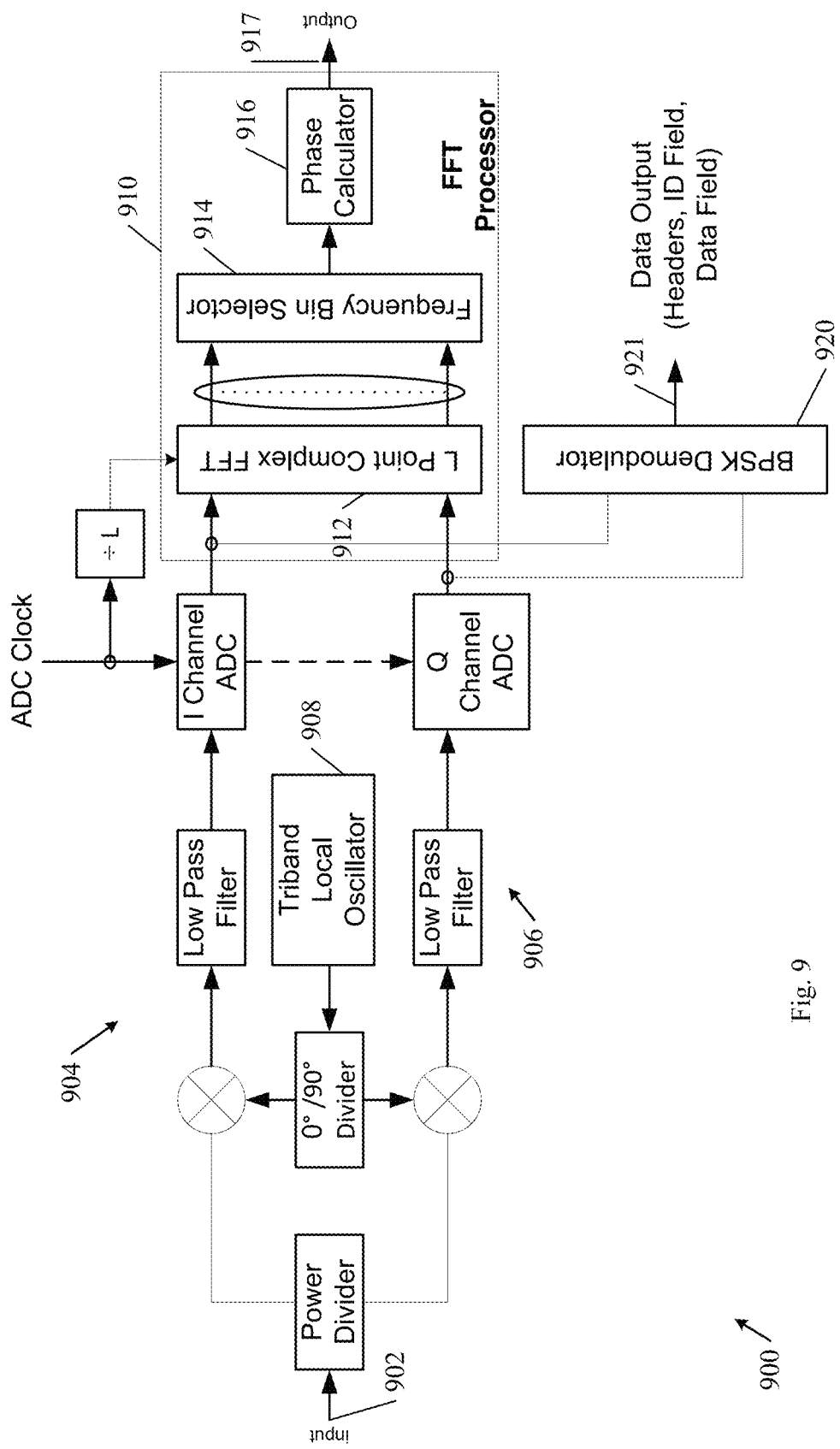
FIG. 9 is a schematic illustration of a receiver baseband processor, in accordance with some demonstrative embodiments.

FIG. 9 is a schematic illustration of a receiver baseband processor 900, in accordance with some demonstrative embodiments. For example, baseband processor 900 may perform the functionality of baseband processor 808 (FIG. 8).

In some demonstrative embodiments, baseband processor 900 may include a chain 904 and a chain 906 to process In-Phase (I) and Quadrature (Q) components of input signals 902, e.g., received from pixel processor 806 (FIG. 8).

In some demonstrative embodiments, baseband processor 900 may include a tri-band local oscillator 908 configured to generate an oscillator frequency selected from three predefined frequencies, e.g., a frequency of band 502 (FIG. 5), a frequency of band 504 (FIG. 5) and a frequency of band 506 (FIG. 5). For example, controller 111 (FIG. 1) may set oscillator 908 to one of the three frequencies, e.g., based on the frequency used for communicating portions 602 (FIG. 6) and 604 (FIG. 6).

In some demonstrative embodiments, baseband processor 900 may include a demodulator, e.g., a BPSK demodulator 920, to demodulate portion 602 (FIG. 6) of packet 600 (FIG. 6), and generate a data output 921, e.g., including the information of fields 606, 608, 610 and/or 612 (FIG. 6).

In some demonstrative embodiments, baseband processor 900 may include a Fast-Fourier-Transform (FFT) processor 910 to process the ranging signals 614 (FIG. 6) of packet 600 (FIG. 6), e.g., as described below.

In some demonstrative embodiments, FFT processor 910 may include an FFT converter 912 to generate a plurality of FFT frequency bins, e.g., including L bins, based on the portion 604 (FIG. 6) of input 902. For, example, each frequency bin may output a complex number, which may be expressed, for example, in polar form, as a magnitude and a phase.

In some demonstrative embodiments, FFT processor 910 may include a frequency bin selector 914 to select a frequency bin from the plurality of frequency bins. For example, controller 111 (FIG. 1) may control frequency bin selector 914 to select a frequency bin corresponding to the ranging frequency indicated by header 608 (FIG. 6), e.g., as described above.

In some demonstrative embodiments, FFT processor 910 may include a phase calculator 916 to calculate a phase 917 corresponding to the selected frequency bin.

Figure 10:
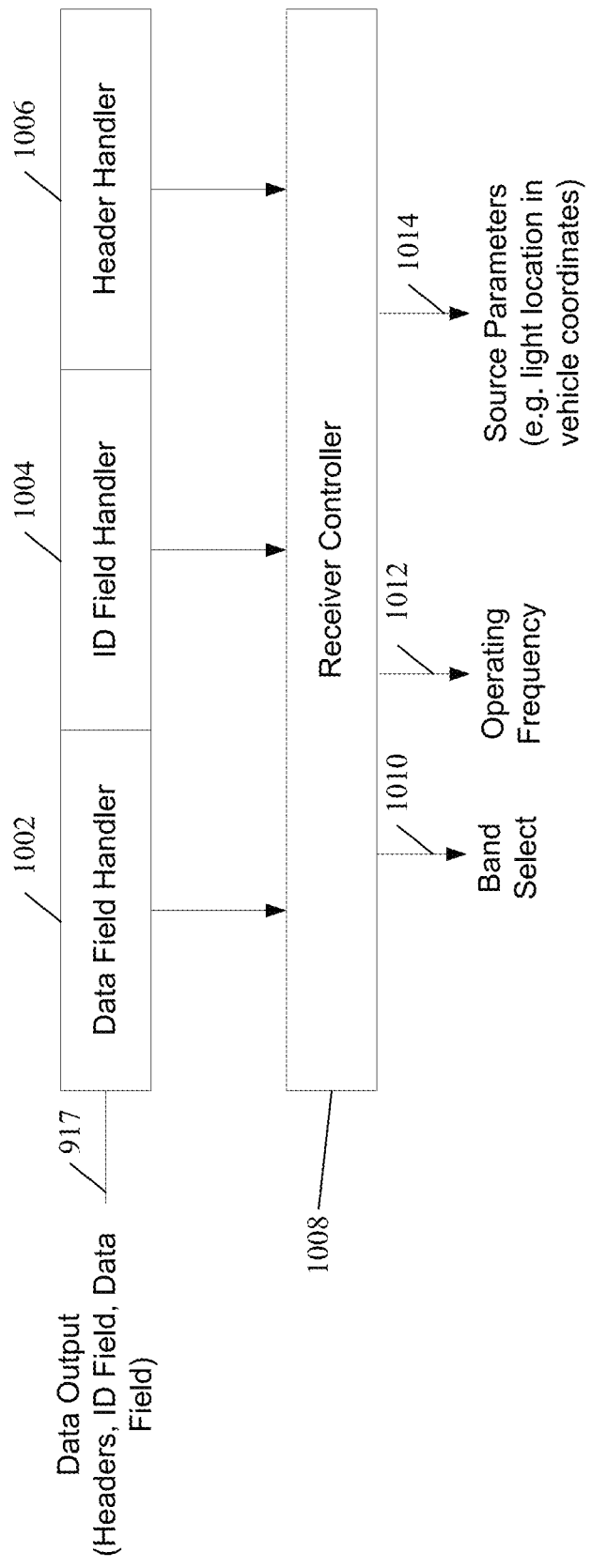
FIG. 10 is a schematic illustration of a receiver packet processor, in accordance with some demonstrative embodiments.

FIG. 10 is a schematic illustration of a receiver packet processor 1000, in accordance with some demonstrative embodiments. For example, packet processor 1000 may be configured to process portion 602 (FIG. 6) of packet 600 (FIG. 6), e.g., based on data output 917.

In some demonstrative embodiments, packet processor 1000 may include a data field handler 1002 to process data field 612 (FIG. 6), an ID field handler 1004 to process ID field 610 (FIG. 6) and/or a header handler 1006 to process header 608 (FIG. 6).

In some demonstrative embodiments, a receiver controller 1008 may be configured to control receiver 800 (FIG. 8) based on the fields 608, 610 and/or 612 (FIG. 6). For example, receiver controller 1008 may perform the functionality of receiver 111 (FIG. 1).

In some demonstrative embodiments, receiver controller 1008 may generate band selection signals 1010 to control receiver 800 (FIG. 8) to select the frequency band for receiving the portions 602 and/or 604 (FIG. 6) of packet 600 (FIG. 6), e.g., as described above.

In some demonstrative embodiments, receiver controller 1008 may generate operating frequency selection signals 1012 to control receiver 800 (FIG. 8) to select the operating frequency for receiving signals 614 (FIG. 6), e.g., as described above.

In some demonstrative embodiments, receiver controller 1008 may generate source parameters 1014 to be processed, e.g., by processor 114 (FIG. 1), based on data field 612 (FIG. 6), e.g., as described above.

In some demonstrative embodiments, upon achieving synchronization, receiver controller 1008 may control receiver 800 (FIG. 8) to read header 608 (FIG. 6), for example, to determine the type of packet 600 (FIG. 6), e.g., one-way or two-way ranging, to determine the frequency band to be used for detecting ranging signals 614 (FIG. 6), and to determine the slow hopping frequency offset that will be used for the ranging signals 614.

In some demonstrative embodiments, receiver controller 1008 may control receiver 800 (FIG. 8) to read ID field 610 (FIG. 6), for example, to identify the vehicle from which packet 600 (FIG. 6) is transmitted.

In some demonstrative embodiments, positioning system 110 (FIG. 1) may perform parallel processing of phases of signals received via multiple receiving sensors, e.g., 12 sensors, 3 per each side of vehicle 102 (FIG. 1), or any other number or configuration of sensors.

In some demonstrative embodiments, the receiving vehicle may process multiple packets from multiple light sources sent by multiple vehicles.

In some demonstrative embodiments, receiver controller 1008 may pair up the light sources from the same vehicles, e.g., in order to successfully process the received data. For example, if a receiving vehicle can observe 8 vehicles, with 3 light sources per vehicle, then the receiver may process 24 data streams to be matched up with the appropriate transmitting vehicle source.

In some demonstrative embodiments, receiver controller 1008 may control receiver 800 (FIG. 8) to read data field 612 (FIG. 6), for example, to determine the information about the transmitting vehicle and the particular transmitting light.

In some demonstrative embodiments, data field 612 (FIG. 6) corresponding to a light source may include a coordinate position of a light source on the transmitting vehicle and a height of the light source about ground.

Figure 11:
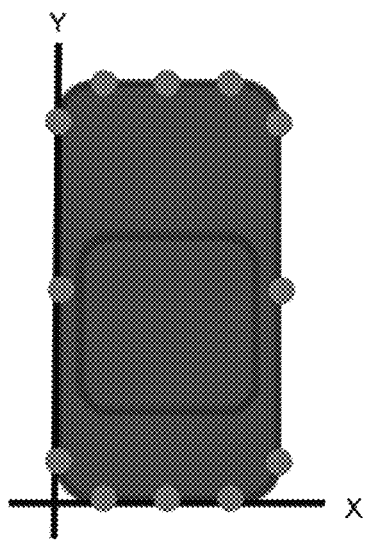
FIG. 11 is a schematic illustration of a vehicle coordinate system, in accordance with some demonstrative embodiments.

FIG. 11 schematically illustrates a vehicle coordinate system, in accordance with some demonstrative embodiments.

In some demonstrative embodiments, data field 612 (FIG. 6) may also include, for example, local coordinates, e.g., GPS coordinates, of the transmitter vehicle, a relative positioning map of surrounding vehicles as seen by the transmitting vehicle, and/or any other information.

In some demonstrative embodiments, receiver controller 1008 may control receiver 800 (FIG. 8) to detect the ranging signals 614 (FIG. 6) of packet 600 (FIG. 6), e.g., as described above. For example, receiver controller 1008 may control receiver 800 (FIG. 8) to tune the operating frequency as indicated in the header field, pair up the transmitting sources as required by the signal processing algorithm, and then extract the phase difference of arrival information.

Figure 12:
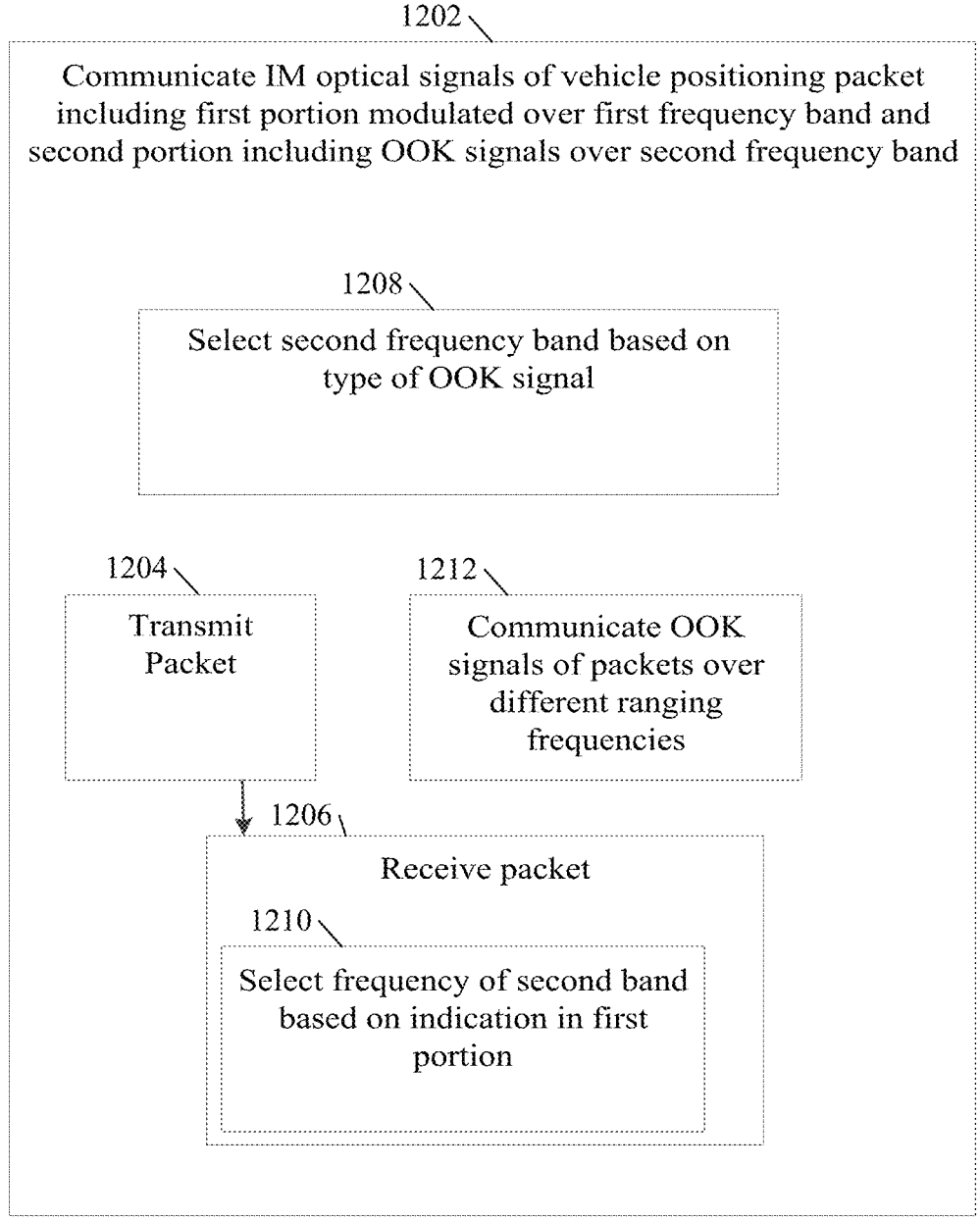
FIG. 12 is a schematic flow chart illustration of a method of communicating vehicle-positioning information, in accordance with some demonstrative embodiments.

Reference is made to FIG. 12, which schematically illustrates a method of estimating a location of a mobile device, in accordance with some demonstrative embodiments. In some demonstrative embodiments, one or more of the operations of the method of FIG. 12 may be performed by one or more elements of a system, e.g., system 100 (FIG. 1), a vehicle, e.g., vehicle 102 (FIG. 1) or vehicle 104 (FIG. 1), a positioning system, e.g., positioning system 110 (FIG. 1), an optical communication unit, e.g., optical communication unit 112 (FIG. 1), a controller, e.g., controller 111 (FIG. 1), controller 711 (FIG. 7), and/or a processor, e.g., processor 114 (FIG. 1), baseband processor 808 (FIG. 8), baseband processor 900 (FIG. 9), and/or packet processor 1000 (FIG. 10).

As indicated at block 1202, the method may include communicating IM optical signals of a positioning packet. The positioning packet may include a first portion including information modulated over a first frequency band, and a second portion including OOK signals over a second frequency band, which is different from the first frequency band. For example, optical communication unit 112 (FIG. 1) may communicate packet 600 (FIG. 6), e.g., as described above.

As indicated at block 1204, the method may include transmitting the positioning packet. For example, optical communication unit 112 (FIG. 1) may transmit packet 600 (FIG. 6), e.g., as described above.

As indicated at block 1206, the method may include receiving the positioning packet. For example, optical communication unit 112 (FIG. 1) may receive packet 600 (FIG. 6), e.g., as described above.

As indicated at block 1208, the method may include selecting the second frequency band from first and second predefined ranging frequency bands, based on a type of the OOK signals. For example, optical communication unit 112 (FIG. 1) may select the second frequency band to include the first ranging frequency band, if the OOK signals include two-way positioning signals, and to include the second ranging frequency band, if the OOK signals include one-way positioning signals, e.g., as described above.

As indicated at block 1210, the method may include selecting the second frequency band based on an indication, in the first portion. For example, receiver controller 1008 (FIG. 10) may select the ranging frequency for receiving ranging signals 614 (FIG. 6) based on header 608 (FIG. 6), e.g., as described above.

As indicated at block 1212, the method may include communicating OOK signals of two or more positioning packets over different ranging frequencies. For example, optical communication unit 112 (FIG. 1) may communicate OOK signals of a first vehicle-positioning packet over a first ranging frequency within the second frequency band, and OOK signals of a second vehicle-positioning packet over a second ranging frequency within the second frequency band, wherein the second ranging frequency is different from the first ranging frequency, e.g., as described above.

Figure 13:
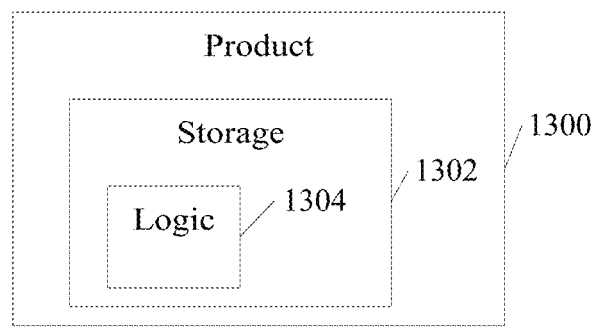
FIG. 13 is a schematic illustration of a product of manufacture, in accordance with some demonstrative embodiments.

Reference is made to FIG. 13, which schematically illustrates a product of manufacture 1300, in accordance with some demonstrative embodiments. Product 1300 may include a non-transitory machine-readable storage medium 1302 to store logic 1304, which may be used, for example, to perform at least part of the functionality of a positioning system, e.g., positioning system 110 (FIG. 1), an optical communication unit, e.g., optical communication unit 112 (FIG. 1), a controller, e.g., controller 111 (FIG. 1), controller 711 (FIG. 7), and/or a processor, e.g., processor 114 (FIG. 1), baseband processor 808 (FIG. 8), baseband processor 900 (FIG. 9), and/or packet processor 1000 (FIG. 10), and/or to perform one or more operations of the method of FIG. 12. The phrase "non-transitory machine-readable medium" is directed to include all computer-readable media, with the sole exception being a transitory propagating signal.

In some demonstrative embodiments, product 1300 and/or machine-readable storage medium 1302 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1302 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1304 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1304 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Examples

The following examples pertain to further embodiments.

Example 1 includes an apparatus comprising an optical communication unit to communicate Intensity-Modulated (IM) optical signals of a positioning packet, the positioning packet including a first portion and a second portion, the first portion including information modulated over a first frequency band, and the second portion including On-Off-Keying (OOK) signals over a second frequency band, the second frequency band is different from the first frequency band.

Example 2 includes the subject matter of Example 1 and optionally, wherein the optical communication unit is to select the second frequency band from first and second predefined ranging frequency bands, based on a type of the OOK signals.

Example 3 includes the subject matter of Example 2 and optionally, wherein the optical communication unit is to select the second frequency band to include the first ranging frequency band, if the OOK signals comprise two-way positioning signals, and to select the second frequency band to include the second ranging frequency band, if the OOK signals comprise one-way positioning signals.

Example 4 includes the subject matter of Example 2 or 3 and optionally, wherein the first frequency band is between the first and second ranging frequency bands.

Example 5 includes the subject matter of Example 4 and optionally, wherein the first ranging frequency band comprises frequencies equal to or less than 20 Megahertz (MHz), and wherein the second ranging frequency band comprises frequencies equal to or greater than 40 MHz.

Example 6 includes the subject matter of any one of Examples 1-5 and optionally, wherein the first portion includes an indication of the second frequency band.

Example 7 includes the subject matter of any one of Examples 1-6 and optionally, wherein the optical communication unit is to transmit the positioning packet.

Example 8 includes the subject matter of Example 7 and optionally, comprising a light source to emit the IM optical signals of the positioning packet.

Example 9 includes the subject matter of Example 8 and optionally, wherein the light source comprises a light emitting diode (LED) or a laser diode.

Example 10 includes the subject matter of any one of Examples 1-6 and optionally, wherein the optical communication unit is to receive the positioning packet.

Example 11 includes the subject matter of Example 10 and optionally, comprising a light receiver to receive the IM optical signals of the positioning packet.

Example 12 includes the subject matter of Example 11 and optionally, comprising a lensed detector array to map an angle of arrival of the optical signals to pixel locations on an image plane.

Example 13 includes the subject matter of any one of Examples 1-12 and optionally, wherein the optical communication unit is to communicate OOK signals of a first positioning packet over a first ranging frequency within the second frequency band, and to communicate OOK signals of a second positioning packet over a second ranging frequency within the second frequency band, the second ranging frequency different from the first ranging frequency.

Example 14 includes the subject matter of Example 13 and optionally, wherein the first and second ranging frequencies are selected according to a predefined frequency hopping size.

Example 15 includes the subject matter of Example 13 or 14 and optionally, wherein the first and second ranging frequencies are randomly selected.

Example 16 includes the subject matter of any one of Examples 1-15 and optionally, wherein the OOK signals comprise one-way positioning signals transmitted from a first vehicle to a second vehicle.

Example 17 includes the subject matter of any one of Examples 1-15 and optionally, wherein the OOK signals comprise two-way positioning signals transmitted by a vehicle, reflected by an object, and received back by the vehicle.

Example 18 includes the subject matter of any one of Examples 1-17 and optionally, wherein the first frequency band comprises a frequency band having a central frequency of 30 Megahertz.

Example 19 includes the subject matter of any one of Examples 1-18 and optionally, wherein the information of the first portion is modulated by Binary-Phase-Shift-Keying (BPSK).

Example 20 includes the subject matter of any one of Examples 1-19 and optionally, wherein the first portion includes a header field including an indicator to indicate whether the second portions is communicated over a first predefined band or a second predefined band.

Example 21 includes the subject matter of any one of Examples 1-20 and optionally, wherein the first portion includes a data field including data corresponding to a device from which the positioning packet is transmitted.

Example 22 includes the subject matter of Example 21 and optionally, wherein the data includes at least one data element selected from the group consisting of a location on the device from which the positioning packet is transmitted, a velocity of the device, and an acceleration of the device.

Example 23 includes the subject matter of any one of Examples 1-22 and optionally, wherein the positioning packet comprises a vehicle-positioning packet.

Example 24 includes a vehicle positioning system comprising at least one optical communication unit to communicate Intensity-Modulated (IM) optical signals of a vehicle-positioning packet, the vehicle-positioning packet including a first portion and a second portion, the first portion including information modulated over a first frequency band, and the second portion including On-Off-Keying (OOK) signals over a second frequency band, the second frequency band is different from the first frequency band; and a processor to process the vehicle-positioning packet to determine positioning information corresponding to a vehicle.

Example 25 includes the subject matter of Example 24 and optionally, wherein the optical communication unit is to select the second frequency band from first and second predefined ranging frequency bands, based on a type of the OOK signals.

Example 26 includes the subject matter of Example 25 and optionally, wherein the optical communication unit is to select the second frequency band to include the first ranging frequency band, if the OOK signals comprise two-way positioning signals, and to select the second frequency band to include the second ranging frequency band, if the OOK signals comprise one-way positioning signals.

Example 27 includes the subject matter of Example 25 or 26 and optionally, wherein the first frequency band is between the first and second ranging frequency bands.

Example 28 includes the subject matter of Example 27 and optionally, wherein the first ranging frequency band comprises frequencies equal to or less than 20 Megahertz (MHz), and wherein the second ranging frequency band comprises frequencies equal to or greater than 41 MHz.

Example 29 includes the subject matter of any one of Examples 24-28 and optionally, wherein the first portion includes an indication of the second frequency band.

Example 30 includes the subject matter of any one of Examples 24-29 and optionally, wherein the optical communication unit is to transmit the vehicle-positioning packet.

Example 31 includes the subject matter of Example 30 and optionally, comprising a light source to emit the IM optical signals of the vehicle-positioning packet.

Example 32 includes the subject matter of Example 31 and optionally, wherein the light source comprises a light emitting diode (LED) or a laser diode.

Example 33 includes the subject matter of any one of Examples 24-29 and optionally, wherein the optical communication unit is to receive the vehicle-positioning packet.

Example 34 includes the subject matter of Example 33 and optionally, comprising a light receiver to receive the IM optical signals of the vehicle-positioning packet.

Example 35 includes the subject matter of Example 34 and optionally, comprising a lensed detector array to map an angle of arrival of the optical signals to pixel locations on an image plane.

Example 36 includes the subject matter of any one of Examples 24-35 and optionally, wherein the optical communication unit is to communicate OOK signals of a first vehicle-positioning packet over a first ranging frequency within the second frequency band, and to communicate OOK signals of a second vehicle-positioning packet over a second ranging frequency within the second frequency band, the second ranging frequency different from the first ranging frequency.

Example 37 includes the subject matter of Example 36 and optionally, wherein the first and second ranging frequencies are selected according to a predefined frequency hopping size.

Example 38 includes the subject matter of Example 36 or 37 and optionally, wherein the first and second ranging frequencies are randomly selected.

Example 39 includes the subject matter of any one of Examples 24-38 and optionally, wherein the OOK signals comprise one-way positioning signals transmitted from a first vehicle to a second vehicle.

Example 40 includes the subject matter of any one of Examples 24-38 and optionally, wherein the OOK signals comprise two-way positioning signals transmitted by a vehicle, reflected by an object, and received back by the vehicle.

Example 41 includes the subject matter of any one of Examples 24-40 and optionally, wherein the first frequency band comprises a frequency band having a central frequency of 31 Megahertz.

Example 42 includes the subject matter of any one of Examples 24-41 and optionally, wherein the information of the first portion is modulated by Binary-Phase-Shift-Keying (BPSK).

Example 43 includes the subject matter of any one of Examples 24-42 and optionally, wherein the first portion includes a header field including an indicator to indicate whether the second portions is communicated over a first predefined band or a second predefined band.

Example 44 includes the subject matter of any one of Examples 24-43 and optionally, wherein the first portion includes a data field including data corresponding to a vehicle from which the vehicle-positioning packet is transmitted.

Example 45 includes the subject matter of Example 44 and optionally, wherein the data includes at least one data element selected from the group consisting of a location on the vehicle from which the vehicle-positioning packet is transmitted, a velocity of the vehicle, and an acceleration of the vehicle.

Example 46 includes a method of vehicle positioning, the method comprising communicating Intensity-Modulated (IM) optical signals of a vehicle-positioning packet, the vehicle-positioning packet including a first portion and a second portion, the first portion including information modulated over a first frequency band, and the second portion including On-Off-Keying (OOK) signals over a second frequency band, the second frequency band is different from the first frequency band.

Example 47 includes the subject matter of Example 46 and optionally, comprising selecting the second frequency band from first and second predefined ranging frequency bands, based on a type of the OOK signals.

Example 48 includes the subject matter of Example 47 and optionally, comprising selecting the second frequency band to include the first ranging frequency band, if the OOK signals comprise two-way positioning signals, and selecting the second frequency band to include the second ranging frequency band, if the OOK signals comprise one-way positioning signals.

Example 49 includes the subject matter of Example 46 or 47 and optionally, wherein the first frequency band is between the first and second ranging frequency bands.

Example 50 includes the subject matter of Example 49 and optionally, wherein the first ranging frequency band comprises frequencies equal to or less than 20 Megahertz (MHz), and wherein the second ranging frequency band comprises frequencies equal to or greater than 41 MHz.

Example 51 includes the subject matter of any one of Examples 46-50 and optionally, wherein the first portion includes an indication of the second frequency band.

Example 52 includes the subject matter of any one of Examples 46-51 and optionally, comprising transmitting the vehicle-positioning packet.

Example 53 includes the subject matter of Example 52 and optionally, comprising emitting the IM optical signals of the vehicle-positioning packet by a light source.

Example 54 includes the subject matter of Example 53 and optionally, wherein the light source comprises a light emitting diode (LED) or a laser diode.

Example 55 includes the subject matter of any one of Examples 46-51 and optionally, comprising receiving the vehicle-positioning packet.

Example 56 includes the subject matter of Example 55 and optionally, comprising mapping an angle of arrival of the optical signals to pixel locations on an image plane.

Example 57 includes the subject matter of any one of Examples 46-56 and optionally, comprising communicating OOK signals of a first vehicle-positioning packet over a first ranging frequency within the second frequency band, and communicating OOK signals of a second vehicle-positioning packet over a second ranging frequency within the second frequency band, the second ranging frequency different from the first ranging frequency.

Example 58 includes the subject matter of Example 57 and optionally, wherein the first and second ranging frequencies are selected according to a predefined frequency hopping size.

Example 59 includes the subject matter of Example 57 or 58 and optionally, wherein the first and second ranging frequencies are randomly selected.

Example 60 includes the subject matter of any one of Examples 46-59 and optionally, wherein the OOK signals comprise one-way positioning signals transmitted from a first vehicle to a second vehicle.

Example 61 includes the subject matter of any one of Examples 46-60 and optionally, wherein the OOK signals comprise two-way positioning signals transmitted by a vehicle, reflected by an object, and received back by the vehicle.

Example 62 includes the subject matter of any one of Examples 46-61 and optionally, wherein the first frequency band comprises a frequency band having a central frequency of 31 Megahertz.

Example 63 includes the subject matter of any one of Examples 46-62 and optionally, wherein the information of the first portion is modulated by Binary-Phase-Shift-Keying (BPSK).

Example 64 includes the subject matter of any one of Examples 46-63 and optionally, wherein the first portion includes a header field including an indicator to indicate whether the second portions is communicated over a first predefined band or a second predefined band.

Example 65 includes the subject matter of any one of Examples 46-64 and optionally, wherein the first portion includes a data field including data corresponding to a vehicle from which the vehicle-positioning packet is transmitted.

Example 66 includes the subject matter of Example 65 and optionally, wherein the data includes at least one data element selected from the group consisting of a location on the vehicle from which the vehicle-positioning packet is transmitted, a velocity of the vehicle, and an acceleration of the vehicle.

Example 67 includes a non-transitory product including a storage medium having stored thereon instructions that, when executed by a machine, result in communicating Intensity-Modulated (IM) optical signals of a vehicle-positioning packet, the vehicle-positioning packet including a first portion and a second portion, the first portion including information modulated over a first frequency band, and the second portion including On-Off-Keying (OOK) signals over a second frequency band, the second frequency band is different from the first frequency band.

Example 68 includes the subject matter of Example 67 and optionally, wherein the instructions result in selecting the second frequency band from first and second predefined ranging frequency bands, based on a type of the OOK signals.

Example 69 includes the subject matter of Example 68 and optionally, wherein the instructions result in selecting the second frequency band to include the first ranging frequency band, if the OOK signals comprise two-way positioning signals, and selecting the second frequency band to include the second ranging frequency band, if the OOK signals comprise one-way positioning signals.

Example 70 includes the subject matter of Example 67 or 68 and optionally, wherein the first frequency band is between the first and second ranging frequency bands.

Example 71 includes the subject matter of Example 70 and optionally, wherein the first ranging frequency band comprises frequencies equal to or less than 20 Megahertz (MHz), and wherein the second ranging frequency band comprises frequencies equal to or greater than 41 MHz.

Example 72 includes the subject matter of any one of Examples 67-71 and optionally, wherein the first portion includes an indication of the second frequency band.

Example 73 includes the subject matter of any one of Examples 67-72 and optionally, wherein the instructions result in transmitting the vehicle-positioning packet.

Example 74 includes the subject matter of Example 73 and optionally, wherein the instructions result in emitting the IM optical signals of the vehicle-positioning packet by a light source.

Example 75 includes the subject matter of Example 74 and optionally, wherein the light source comprises a light emitting diode (LED) or a laser diode.

Example 76 includes the subject matter of any one of Examples 67-72 and optionally, wherein the instructions result in receiving the vehicle-positioning packet.

Example 77 includes the subject matter of Example 76 and optionally, wherein the instructions result in mapping an angle of arrival of the optical signals to pixel locations on an image plane.

Example 78 includes the subject matter of any one of Examples 67-77 and optionally, wherein the instructions result in communicating OOK signals of a first vehicle-positioning packet over a first ranging frequency within the second frequency band, and communicating OOK signals of a second vehicle-positioning packet over a second ranging frequency within the second frequency band, the second ranging frequency different from the first ranging frequency.

Example 79 includes the subject matter of Example 78 and optionally, wherein the first and second ranging frequencies are selected according to a predefined frequency hopping size.

Example 80 includes the subject matter of Example 78 or 79 and optionally, wherein the first and second ranging frequencies are randomly selected.

Example 81 includes the subject matter of any one of Examples 67-80 and optionally, wherein the OOK signals comprise one-way positioning signals transmitted from a first vehicle to a second vehicle.

Example 82 includes the subject matter of any one of Examples 67-81 and optionally, wherein the OOK signals comprise two-way positioning signals transmitted by a vehicle, reflected by an object, and received back by the vehicle.

Example 83 includes the subject matter of any one of Examples 67-82 and optionally, wherein the first frequency band comprises a frequency band having a central frequency of 31 Megahertz.

Example 84 includes the subject matter of any one of Examples 67-83 and optionally, wherein the information of the first portion is modulated by Binary-Phase-Shift-Keying (BPSK).

Example 85 includes the subject matter of any one of Examples 67-84 and optionally, wherein the first portion includes a header field including an indicator to indicate whether the second portions is communicated over a first predefined band or a second predefined band.

Example 86 includes the subject matter of any one of Examples 67-85 and optionally, wherein the first portion includes a data field including data corresponding to a vehicle from which the vehicle-positioning packet is transmitted.

Example 87 includes the subject matter of Example 86 and optionally, wherein the data includes at least one data element selected from the group consisting of a location on the vehicle from which the vehicle-positioning packet is transmitted, a velocity of the vehicle, and an acceleration of the vehicle.

Example 88 includes an apparatus for vehicle positioning, the apparatus comprising means for communicating Intensity-Modulated (IM) optical signals of a vehicle-positioning packet, the vehicle-positioning packet including a first portion and a second portion, the first portion including information modulated over a first frequency band, and the second portion including On-Off-Keying (OOK) signals over a second frequency band, the second frequency band is different from the first frequency band.

Example 89 includes the subject matter of Example 88 and optionally, comprising means for selecting the second frequency band from first and second predefined ranging frequency bands, based on a type of the OOK signals.

Example 90 includes the subject matter of Example 89 and optionally, comprising means for selecting the second frequency band to include the first ranging frequency band, if the OOK signals comprise two-way positioning signals, and selecting the second frequency band to include the second ranging frequency band, if the OOK signals comprise one-way positioning signals.

Example 91 includes the subject matter of Example 89 or 90 and optionally, wherein the first frequency band is between the first and second ranging frequency bands.

Example 92 includes the subject matter of Example 91 and optionally, wherein the first ranging frequency band comprises frequencies equal to or less than 20 Megahertz (MHz), and wherein the second ranging frequency band comprises frequencies equal to or greater than 41 MHz.

Example 93 includes the subject matter of any one of Examples 88-92 and optionally, wherein the first portion includes an indication of the second frequency band.

Example 94 includes the subject matter of any one of Examples 88-93 and optionally, comprising means for transmitting the vehicle-positioning packet.

Example 95 includes the subject matter of Example 94 and optionally, comprising means for emitting the IM optical signals of the vehicle-positioning packet by a light source.

Example 96 includes the subject matter of Example 95 and optionally, wherein the light source comprises a light emitting diode (LED) or a laser diode.

Example 97 includes the subject matter of any one of Examples 88-93 and optionally, comprising means for receiving the vehicle-positioning packet.

Example 98 includes the subject matter of Example 97 and optionally, comprising means for mapping an angle of arrival of the optical signals to pixel locations on an image plane.

Example 99 includes the subject matter of any one of Examples 88-98 and optionally, comprising means for communicating OOK signals of a first vehicle-positioning packet over a first ranging frequency within the second frequency band, and communicating OOK signals of a second vehicle-positioning packet over a second ranging frequency within the second frequency band, the second ranging frequency different from the first ranging frequency.

Example 100 includes the subject matter of Example 99 and optionally, wherein the first and second ranging frequencies are selected according to a predefined frequency hopping size.

Example 101 includes the subject matter of Example 99 or 100 and optionally, wherein the first and second ranging frequencies are randomly selected.

Example 102 includes the subject matter of any one of Examples 88-101 and optionally, wherein the OOK signals comprise one-way positioning signals transmitted from a first vehicle to a second vehicle.

Example 103 includes the subject matter of any one of Examples 88-102 and optionally, wherein the OOK signals comprise two-way positioning signals transmitted by a vehicle, reflected by an object, and received back by the vehicle.

Example 104 includes the subject matter of any one of Examples 88-103 and optionally, wherein the first frequency band comprises a frequency band having a central frequency of 31 Megahertz.

Example 105 includes the subject matter of any one of Examples 88-104 and optionally, wherein the information of the first portion is modulated by Binary-Phase-Shift-Keying (BPSK).

Example 106 includes the subject matter of any one of Examples 88-105 and optionally, wherein the first portion includes a header field including an indicator to indicate whether the second portions is communicated over a first predefined band or a second predefined band.

Example 107 includes the subject matter of any one of Examples 88-106 and optionally, wherein the first portion includes a data field including data corresponding to a vehicle from which the vehicle-positioning packet is transmitted.

Example 108 includes the subject matter of Example 107 and optionally, wherein the data includes at least one data element selected from the group consisting of a location on the vehicle from which the vehicle-positioning packet is transmitted, a velocity of the vehicle, and an acceleration of the vehicle.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
an optical communication unit to communicate Intensity-Modulated (IM) optical signals of a positioning packet, said positioning packet including a first portion and a second portion, said first portion including information modulated over a first frequency band, and said second portion including On-Off-Keying (OOK) signals over a second frequency band, said second frequency band is different from said first frequency band.

2. The apparatus of claim 1, wherein said optical communication unit is to, based on a type of said OOK signals, select said second frequency band from a first predefined ranging frequency band and a second predefined ranging frequency band.

3. The apparatus of claim 2, wherein said optical communication unit is to select said second frequency band to include said first predefined ranging frequency band, if said OOK signals comprise two-way positioning signals, and to select said second frequency band to include said second predefined ranging frequency band, if said OOK signals comprise one-way positioning signals.

4. The apparatus of claim 2, wherein said first frequency band is between said first and second predefined ranging frequency bands.

5. The apparatus of claim 4, wherein said first predefined ranging frequency band comprises frequencies equal to or less than 20 Megahertz (MHz), and wherein said second predefined ranging frequency band comprises frequencies equal to or greater than 40 MHz.

6. The apparatus of claim 1, wherein said first portion includes an indication of said second frequency band.

7. The apparatus of claim 1, wherein said optical communication unit is to transmit said positioning packet.

8. The apparatus of claim 7 comprising a light source to emit said IM optical signals of said positioning packet.

9. The apparatus of claim 8, wherein said light source comprises a light emitting diode (LED) or a laser diode.

10. The apparatus of claim 1, wherein said optical communication unit is to receive said positioning packet.

11. The apparatus of claim 10 comprising a light receiver to receive said IM optical signals of said positioning packet.

12. The apparatus of claim 11 comprising a lensed detector array to map an angle of arrival of said IM optical signals to pixel locations on an image plane.

13. The apparatus of claim 1, wherein said optical communication unit is to communicate OOK signals of a first positioning packet over a first ranging frequency within said second frequency band, and to communicate OOK signals of a second positioning packet over a second ranging frequency within said second frequency band, said second ranging frequency different from said first ranging frequency.

14. The apparatus of claim 13, wherein said first and second ranging frequencies are selected according to a predefined frequency hopping size.

15. The apparatus of claim 13, wherein said first and second ranging frequencies are randomly selected.

16. The apparatus of claim 1, wherein said first frequency band comprises a frequency band having a central frequency of 30 Megahertz.

17. The apparatus of claim 1, wherein the information of said first portion is modulated by Binary-Phase-Shift-Keying (BPSK).

18. The apparatus of claim 1, wherein said first portion includes a header field including an indicator to indicate whether said second portions is communicated over a first predefined band or a second predefined band.

19. The apparatus of claim 1, wherein said first portion includes a data field including data corresponding to a device from which said positioning packet is transmitted.

20. The apparatus of claim 19, wherein said data field includes at least one data element selected from the group consisting of a location on said device from which said positioning packet is transmitted, a velocity of said device, and an acceleration of said device.

21. A vehicle positioning system comprising:
at least one optical communication unit to communicate Intensity-Modulated (IM) optical signals of a vehicle-positioning packet, said vehicle-positioning packet including a first portion and a second portion, said first portion including information modulated over a first frequency band, and said second portion including On-Off-Keying (OOK) signals over a second frequency band, said second frequency band is different from said first frequency band; and
a processor to process said vehicle-positioning packet to determine positioning information corresponding to a vehicle.

22. The system of claim 21, wherein said optical communication unit is to select said second frequency band from first and second predefined ranging frequency bands, based on a type of said OOK signals.

23. The system of claim 21, wherein said optical communication unit is to communicate OOK signals of a first vehicle-positioning packet over a first ranging frequency within said second frequency band, and to communicate OOK signals of a second vehicle-positioning packet over a second ranging frequency within said second frequency band, said second ranging frequency different from said first ranging frequency.

24. A method of vehicle positioning, the method comprising:
communicating Intensity-Modulated (IM) optical signals of a vehicle-positioning packet, said vehicle-positioning packet including a first portion and a second portion, said first portion including information modulated over a first frequency band, and said second portion including On-Off-Keying (OOK) signals over a second frequency band, said second frequency band is different from said first frequency band.

25. The method of claim 24 comprising communicating OOK signals of a first vehicle-positioning packet over a first ranging frequency within said second frequency band, and communicating OOK signals of a second vehicle-positioning packet over a second ranging frequency within said second frequency band, said second ranging frequency different from said first ranging frequency.

26. A non-transitory product including a storage medium having stored thereon instructions that, when executed by a machine, result in:
communicating Intensity-Modulated (IM) optical signals of a vehicle-positioning packet, said vehicle-positioning packet including a first portion and a second portion, said first portion including information modulated over a first frequency band, and said second portion including On-Off-Keying (OOK) signals over a second frequency band, said second frequency band is different from said first frequency band.

27. The product of claim 26, wherein said instructions result in, based on a type of said OOK signals, selecting said second frequency band from a first predefined ranging frequency band and a second predefined ranging frequency band.

28. The product of claim 27, wherein said instructions result in selecting said second frequency band to include said first predefined ranging frequency band, if said OOK signals comprise two-way positioning signals, and selecting said second frequency band to include said second predefined ranging frequency band, if said OOK signals comprise one-way positioning signals.

29. The product of claim 26, wherein said instructions result in communicating OOK signals of a first vehicle-positioning packet over a first ranging frequency within said second frequency band, and communicating OOK signals of a second vehicle-positioning packet over a second ranging frequency within said second frequency band, said second ranging frequency different from said first ranging frequency.

30. The product of claim 26, wherein said first portion includes a header field including an indicator to indicate whether said second portions is communicated over a first predefined band or a second predefined band.

* * * * *